United States Patent [19]
Sabottke

[11] Patent Number: 5,298,155
[45] Date of Patent: Mar. 29, 1994

[54] CONTROLLING YIELDS AND SELECTIVITY IN A FLUID CATALYTIC CRACKER UNIT

[75] Inventor: Craig Y. Sabottke, Morris Township, Morris County, N.J.

[73] Assignee: Exxon Research & Engineering Co., Florham Park, N.J.

[21] Appl. No.: 908,635

[22] Filed: Jul. 2, 1992

Related U.S. Application Data

[63] Continuation of Ser. No. 485,701, Feb. 27, 1990, abandoned.

[51] Int. Cl.$^5$ ............................................. C10G 11/00
[52] U.S. Cl. ................................. 208/157; 208/113; 208/159; 208/DIG. 1; 239/8; 239/126
[58] Field of Search ......... 208/113, 157, 159, DIG. 1; 239/8, 126

[56] References Cited

U.S. PATENT DOCUMENTS

| | | | |
|---|---|---|---|
| 426,514 | 4/1890 | Rice | 239/117 |
| 511,729 | 12/1893 | Deming | 239/117 |
| 721,900 | 3/1903 | Lassoe et al. | 239/406 |
| 981,956 | 1/1919 | Tregoning | 239/438 |
| 1,326,488 | 12/1919 | Fisher | 239/125 |
| 1,481,597 | 1/1924 | Forster | 239/482 |
| 1,879,652 | 9/1932 | Blizard | 239/73 |
| 2,307,014 | 1/1943 | Becker et al. | 299/145 |
| 2,308,909 | 1/1943 | Blanchard | 299/114 |
| 2,488,032 | 11/1949 | Johnson | 196/52 |
| 2,695,265 | 11/1954 | Degnen | 196/52 |
| 2,761,769 | 9/1956 | Elder | 208/157 |
| 2,785,926 | 3/1957 | Lataste | 299/141 |
| 2,850,364 | 9/1958 | Dowling | 208/164 |
| 3,035,780 | 5/1962 | Peras | 239/453 |
| 3,071,540 | 1/1963 | McMahon et al. | 208/163 |
| 3,093,318 | 6/1963 | Chow | 239/456 |
| 3,192,710 | 7/1965 | Wilson, Jr. | 60/35.6 |
| 3,198,237 | 8/1965 | Sadler | 158/76 |
| 3,654,140 | 4/1972 | Griffel et al. | 208/157 X |
| 3,781,533 | 12/1973 | Barnstone et al. | 208/DIG. 1 |
| 4,427,537 | 1/1984 | Dean et al. | 208/157 |
| 4,475,883 | 10/1984 | Schirmer et al. | 431/158 |
| 4,529,573 | 7/1985 | Varady | 208/DIG. 1 |
| 4,650,566 | 3/1987 | Buyan et al. | 208/153 |
| 4,729,825 | 3/1988 | Nielsen | 208/DIG. 1 |
| 4,793,913 | 12/1988 | Chessmore et al. | 208/113 |
| 4,824,557 | 4/1989 | Cartmell et al. | 208/146 |
| 4,861,459 | 8/1989 | Cetinkaya | 208/157 |
| 4,875,996 | 10/1989 | Hsieh et al. | 208/113 X |

Primary Examiner—Nam Nguyen
Assistant Examiner—Walter D. Griffin
Attorney, Agent, or Firm—Henry E. Naylor

[57] ABSTRACT

The invention is directed to a process for controlling product yields in a fluid catalytic cracker unit. In particular, the invention is directed to a process wherein the introduction of feed into a catalytic cracking zone is effected by feed injectors which optimize the atomization of the feed in order to achieve yield and/or quality objectives.

11 Claims, 13 Drawing Sheets

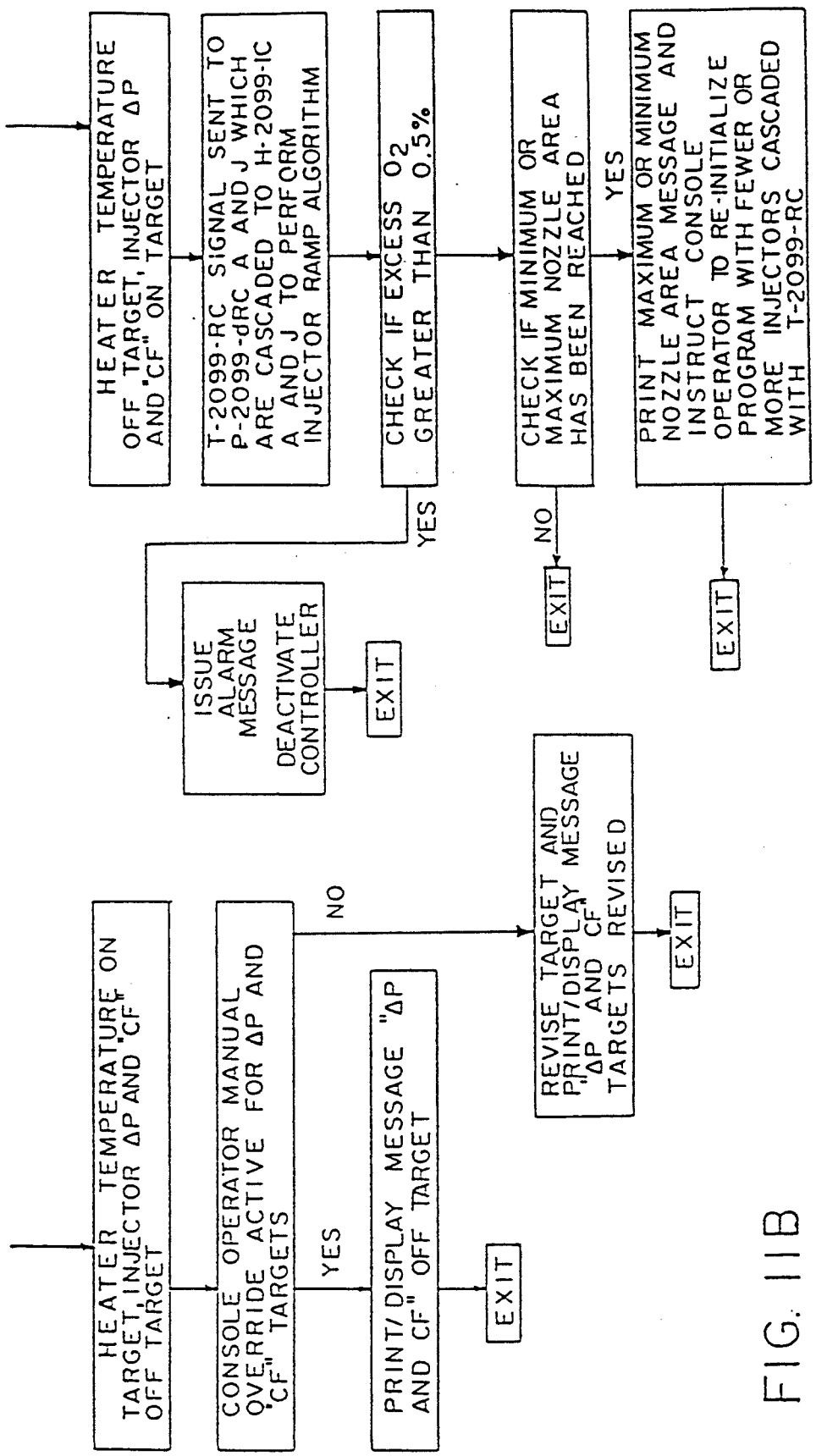
FIG. IIB

CONTROLLING YIELDS AND SELECTIVITY IN A FLUID CATALYTIC CRACKER UNIT

This application is a continuation of application Ser. No. 485,701, filed Feb. 27, 1990 now abandoned.

The invention is directed to a process for controlling product yields in a fluid catalytic cracker unit (FCCU). In particular, the invention is directed to a process wherein the introduction of feed into a catalytic cracking zone is effected by feed injectors which optimize the atomization of the feed in order to achieve yield and/or quality objectives.

BACKGROUND OF THE INVENTION

In the petroleum refining industry, the fluidized catalytic cracking of hydrocarbons is well known and may be accomplished in a variety of processes which employ fluidized solid techniques. Normally in such processes, suitably preheated, relatively high molecular weight hydrocarbon liquids and/or vapors are contacted with hot, finely-divided, solid catalyst particles either in a fluidized bed reaction zone or in an elongated riser reaction zone, and maintained at an elevated temperature in a fluidized state for a period of time sufficient to effect the desired degree of cracking to lower molecular weight hydrocarbons typical of those present in motor gasolines and distillate fuels.

During the cracking reaction, coke is deposited on the catalyst particles in the reaction zone thereby reducing the activity of the catalyst for cracking and the selectivity of the catalyst for producing gasoline blending stock. In order to restore a portion, preferably a major portion, of the activity to the coke-contaminated or spent catalyst, the catalyst is transferred from the reaction zone into a regeneration zone. Typical regeneration zones comprise large vertical cylindrical vessels wherein the spent catalyst is maintained as a fluidized bed by the upward passage of an oxygen-containing regeneration gas, such as air, under conditions to burn at least a portion, preferably a major portion, of the coke from the catalyst. The regenerated catalyst is subsequently withdrawn from the regeneration zone and reintroduced into the reaction zone for reaction with additional hydrocarbon feed.

In a fluid catalytic cracking unit (FCCU), commercial practice has been to employ fixed throat feed injectors. For example, Dean et al., U.S. Pat. No. 4,434,049 and Skraba, U.S. Pat. No. 4,575,414 disclose fixed throat injectors comprising atomizing spray nozzles. Chesmore et al., Japanese Kokai 59-145287 disclose a fixed throat feed injector with spiral momentum. Such fixed throat feed injectors are usually designed on a forecast basis and optimized for a certain feed quality. In the actual plant operation, however, feed quality is usually different from the forecast basis, since business objectives change with time. For these reasons, most conventional FCCU's change their fixed throat feed injectors on a two to three year cycle, which roughly corresponds to the FCCU turnaround cycle.

Furthermore, it is current practice with FCCU operations to practice multivariable constraint control to maximize refinery profits on a continuous basis. An important process variable is the product yield and quality. For example, the naphtha from a catalytic cracker is a large part of the mogas yield from a refinery. In fact, an FCCU is probably the single most important generator of valuable products in a refinery. Due to an FCCU's large throughput, even minor variations of yields can have a significant impact on economics.

Prior art methods of increasing product yield include changing the catalyst used and changing the physical reactor, for example shortening the riser of an FCCU, to achieve a shorter residence time.

There is a need for better and more continuous maximization of catalyst cracking fluid and overall refinery operation in a changing economic environment. During the course of a typical two-to-three year plant run, there is considerable room for increasing yields by continuous optimization.

BRIEF DESCRIPTION OF THE INVENTION

It has now been found that by varying the atomization of the feed introduced into an FCCU, in conjunction with appropriate control instruments, it is possible to obtain an additional degree of freedom to control and optimize product yield and quality in an FCCU process. Further, by means of a new kind of FCCU variable feed injector design, the degree of atomization of the feed into a catalytic cracking zone can be readily varied in real time on a continuous basis.

BRIEF DESCRIPTION OF THE DRAWINGS

The process and apparatus of the invention will be more clearly understood upon reference to the detailed discussion below in conjunction with the drawings wherein.

DETAILED DESCRIPTION OF THE INVENTION

Figure 1:
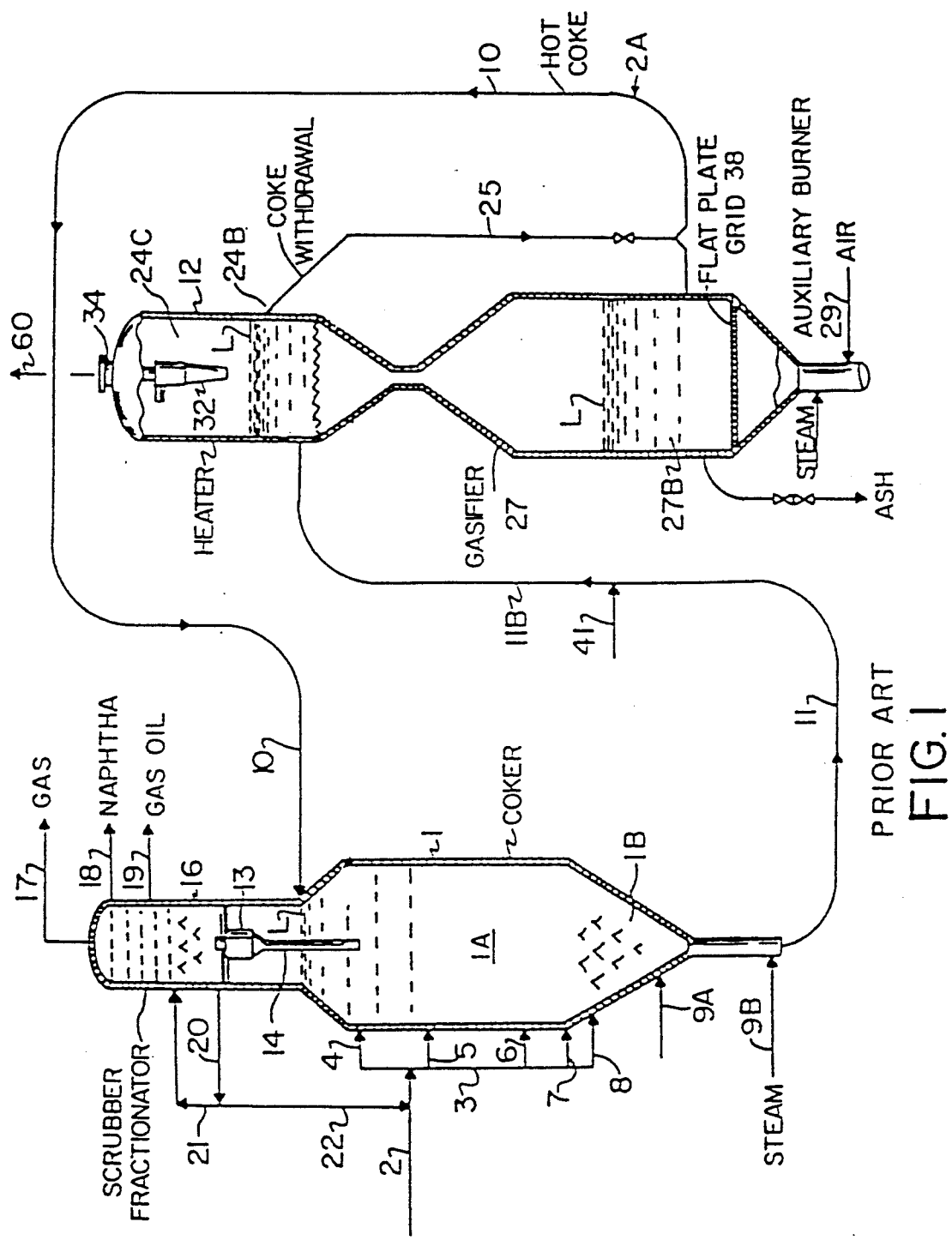
FIG. 1 is a flow diagram of an embodiment of a fluid catalytic cracking unit (FCCU), representative of the prior art, to which the present invention is applicable.

The invention is directed to a process for controlling a catalytic cracking process by varying the atomization of feed introduced into a catalytic cracking zone. In a preferred embodiment, to be described in detail below, a plurality of feed injectors, each comprising a variable throat section thereof, are employed to vary the feed atomization. By such means, it is possible to optimize yield and/or quality objectives through application of various new automatic control schemes to be described in detail below.

In this description, the term "atomization" with respect to the effluent from a feed injector, is meant to encompass the following atomization characteristics: average or mean feed droplet size, droplet size distribution, and spray pattern. Spray pattern refers to spray angles and shape, for example, cone, fan, etc.

Adjusting the atomization of the feed into a catalytic cracking zone can be used to compensate for changing product yield and/or quality objectives in a multivariable constraint control, LP control or non-linear LP control environment. As product values change in the marketplace, FCCU reactor yields can be changed to optimize the economic benefit of the FCCU process on a refinery's operation. This is extremely important at refineries where on-stream blending is conducted.

A common yield objective is to maximize a liquid yield and a common quality objective is to maximize naphtha research octane number, particularly with respect to $C_5$ liquid products (boiling point above 400° F). However, a yield objective may depend, not only on changing economics, but on refinery constraints. For example, it may be the case that, rather than maximizing a liquid yield, a refinery needs to cap the amount of catalytic cracking dry gas ($C_2$-) yield. This objective may be due to a compressor capacity bottleneck. In a typical FCCU, the main air blower and the compressor are two bottlenecks whose maximum capacity is fixed. By minimizing coke yield and limiting throughput of dry gas, it may be possible to maximize the throughput of the most valuable products.

In another case, it may be desirable to maximize the propylene ($C_3$) and butylene ($C_4$) yield for supplying a downstream petrochemical plant. Alternatively, it may be desired to simply maximize the volume yield of clear liquid products having a boiling point of 650° F. or lighter, irrespective of whether it is heating oil or naphtha (referred to as a "sloppy yield objective"). Such an objective typically may exist is certain third world countries.

The present process is applicable to feeds that are either newtonian or non-newtonian fluids. In general, a VGO (vacuum gas oil) feed to an FCCU process behaves as a newtonian fluid. Although high boiling resid feed components and cracked recycle stocks which can be part of the total feed stream sent to the feed injectors may exhibit some non-newtonian characteristics, the assumption that the feed generally behaves as a newtonian fluid is considered reasonable and adequate insofar as equipment design is concerned.

An oil-only feed may be "pressure atomized" and/or sprayed into the FCCU reactor. However, in the preferred operating mode, a lower molecular weight medium is injected into the oil feed. Suitable media include hydrogen, steam, nitrogen, FCC off-gas, and $C_6$-hydrocarbons. Most preferably, a steam/oil mixture is used as the feed stream to the FCCU reactor. The ratio of steam/oil can be adjusted during operations based on changes in oil feed type and properties. The amount of steam in the mixture influences the density of the mixture and will therefore have an impact on atomization. General commercial practice, suitable with the present process, is to use about 1.0 wt % steam for light feed types and about 3.0 to 5.0 wt % steam for heavy, more viscous feed types.

The use of a low molecular weight medium in a FCCU feed injector helps in the vaporization of the liquid droplets of feed material by reducing the oil partial pressure. A simple analogy can be drawn to operation of a vacuum pipestill flash zone. At a fixed pressure and temperature, increasing the steam/oil ratio reduces the oil partial pressure and causes more higher boiling oil components to be vaporized.

In a fluid catalytic cracking (FCC) process, the initial contacting of oil feed with regenerated catalyst and how this contacting is carried out influences the reactor product yields and qualities. Initial contacting can be viewed as a localized zone (control volume) in the reactor system, typically consisting of a steam/oil/catalyst mixture (emulsion). By adjusting the steam/oil ratio and atomization (oil liquid droplet size, droplet size distribution, and/or spray pattern), the reaction pathway can be controlled or influenced in accordance with the present invention.

In general, a degree of feed atomization characterized by a smaller average droplet size, narrow droplet size distribution, and well dispersed spray pattern will result in less coke and less dry gas, thereby tending to maximize liquid yields. As a base point, atomization of the feed may be selected such that the feed droplets match the size and distribution (typically about 60 $\mu$ in average diameter) of the catalyst particles employed in the FCCU. On the other hand, a larger average droplet size and wide distribution, including a portion of droplets significantly larger in size than average, and a spray pattern not well dispersed, can result in a significant increase in coke formation. Subtle changes in atomization therefore can readily cause a change in the coke yield. The selected degree or state of atomization will depend on the process objectives. For example, in order to maximize LPG (liquid propane gas), a fine droplet size may not be ideal. It is believed that droplet size and distribution are important factors in achieving yield objectives. (Similar effects are important in temperature control, as described in U.S. patent application 07/486,046, now abandoned filed concurrently and hereby incorporated by reference.) Data has shown that spray patterns may also drastically effect yields.

A good indicator or measure of the degree or state of feed atomization is the pressure drop ($\Delta P$) across the nozzle of a feed injector. Alternatively, another parameter, such as nozzle cross-sectional area, which is related to $\Delta P$, can be employed as a measure of feed atomization. The nozzle coefficient of resistance, defined in the examples below, is a good measure of feed atomization. Data relating nozzle droplet size, droplet size distribution and spray pattern to nozzle resistance coefficient and $\Delta P$ can be experimentally developed. In a similar fashion, $\Delta P$ can be related to yield and quality shifts for the FCCU reactor. Preferably, each particular FCCU can be tested to empirically develop such relationships or correlations. The control response of each FCCU can be unique because of the actual vendor equipment used to construct it. Process models may also be used to establish these relationships. Example 3 below describes in greater detail an illustrative computer model.

Figure 10A:
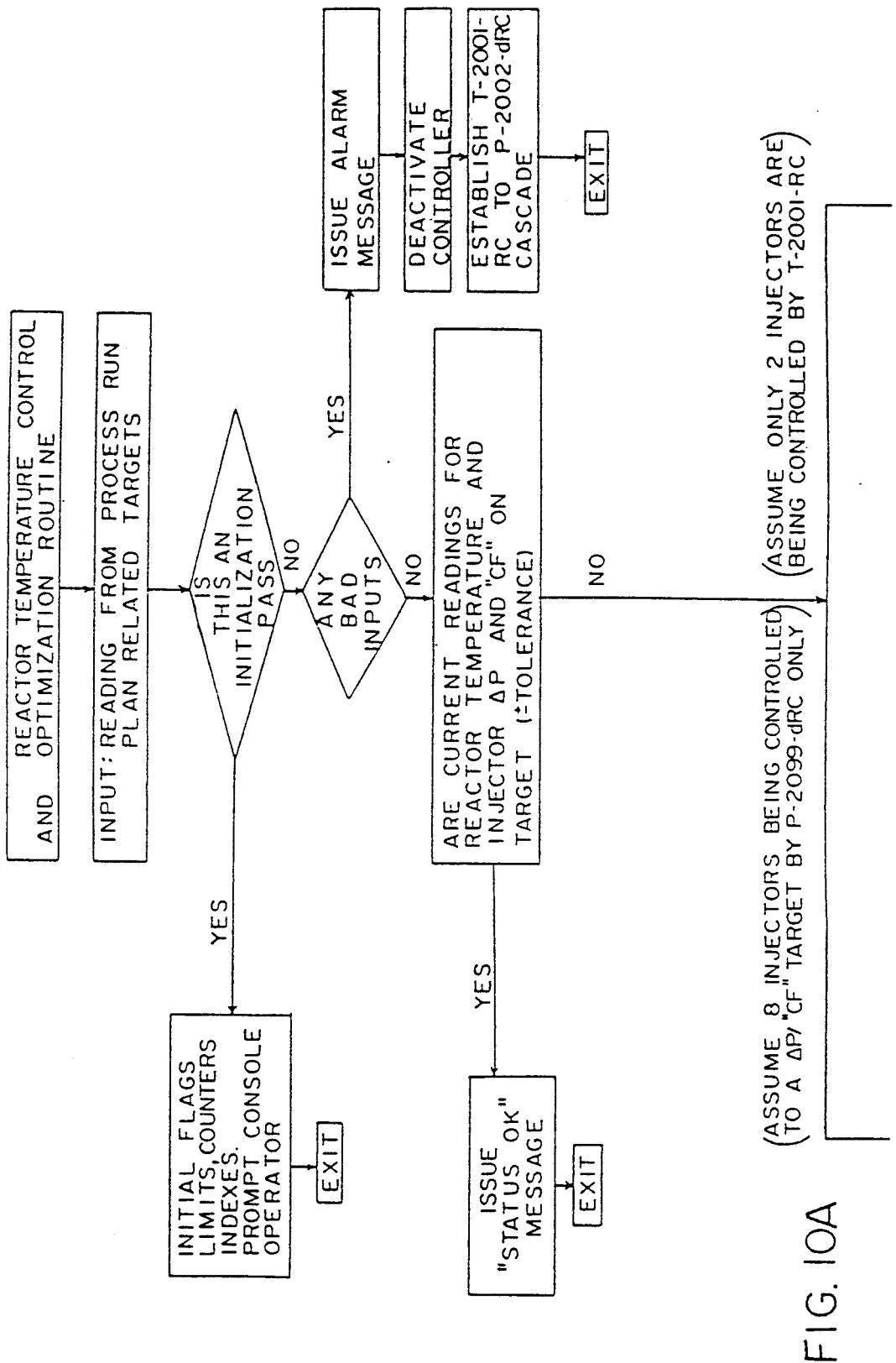
FIG. 10 is a graph showing, for a typical feed injector of the present invention, the nozzle coefficient of resistance versus a specified variable geometric parameter.
Figure 10B:
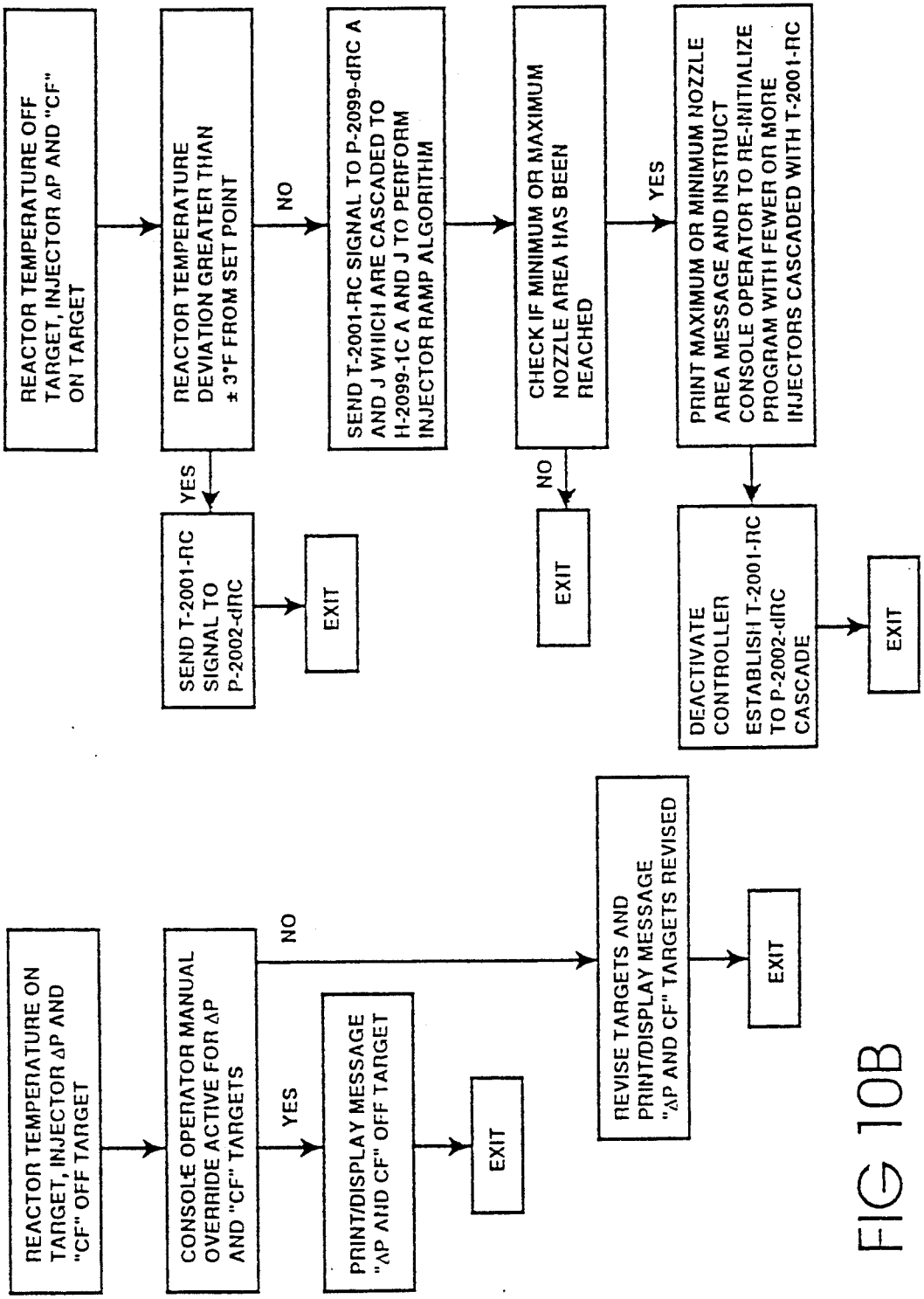

Correlations can also serve as a basis for making estimates of the performance of a particular variable throat feed injector design. Nozzle geometry effects spray pattern, liquid droplet size and droplet size distribution, and is reflected in the nozzle resistance coefficient. For example, FIG. 10 presents a nozzle resistance coefficient curve for one kind of variable throat feed injector.

The preferred means of controlling the atomization of the feed is by monitoring the injector nozzle pressure drop $\Delta P$, for example, by means of a pressure transducer and pressure controller (PdRC), and sending a signal based thereon to an actuator associated with a variable (movable) throat feed injector. The actuator works by moving a shaft over a narrow stroke range. At the distal end of the shaft, an atomization adjusting means, positioned in a throat section of the feed injector, works by varying the throat cross-sectional flow area.

An application software package can be developed to assist the pressure controller in control of the variable (movable) throat feed injectors. Each actuator may have a position indicator which can be field calibrated for each injector. To minimize investment, a single pressure controller (PdRC) may be installed. Instrument piping manifolds can be provided to allow the PdRC to be coupled with any of the injectors. A more expensive configuration would involve individual PdRC instruments for each variable (movable) throat feed injector.

Field calibration curves can be constructed for each variable (movable) throat feed injector to define the relationship between nozzle $\Delta P$ and the position of the adjusting means. Ideally, the same relationship should be determined for each nozzle; however, in actual practice, unit specific piping layout may result in some slight difference among various nozzles. Based on field data, one of the variable (movable) throat nozzles can be selected as the reference sensing nozzle. The PdRC will monitor the pressure drop of this nozzle and send control movement signals to the application program. Based on the field calibration data for each individual variable (movable) throat feed injector and the PdRC signal, the application program will send a signal to the individual actuators/positioners to change the position of the nozzle throat adjusting means as required. To avoid unnecessary actuator hunting, some dead band provision may be provided. Also, a hierarchy may be provided in the application program so that individual nozzles are stroked in a sequential and specific geometric pattern. Two opposing nozzles may be stroked as a pair.

Application of variable throat feed injectors to an FCCU process allows for new control configurations. Reactor product yield and/or quality information may be cascaded to the pressure control (PdRC) of the feed injector nozzle, and feed injector atomization adjusted to optimize yield and/or quality objectives. It is also possible to optimize critical (economically important) product yields for changes in feed quality and other process inputs.

For a typical maximum naphtha operation, a preferred high level control configuration might be as follows. Reactor temperature can be controlled by traditional means to maintain the naphtha yield in an approximate target zone. Naphtha product flow can be used to calculate a naphtha selectivity parameter (naphtha product flow divided by fresh feed flow is a simple definition of naphtha selectivity). This calculated selectivity parameter can be used as a basis for adjustments to the feed atomization to optimize naphtha selectivity. A control application package developed for this purpose would make adjustments in feed atomization to achieve a maximum naphtha selectivity (a feedback control loop).

Knowledge of the feed properties can permit better tuning and optimization. For example, such information allows determination of a cap or limit for achievable yields. A heavy feed and a light feed may require different atomization for optimization. The associated nozzle $\Delta P$ may typically vary 10 to 20 percent. Suitable feed properties for consideration are API gravity and viscosity. Since viscosity is an indication of resistance to fluid shear, a higher nozzle $\Delta P$ would therefore be required to obtain smaller feed droplets.

When monitoring the properties of the feed, conventional analytical instrumentation can be employed. For example, the API gravity or refractive index may be measured. Feed composition and/or properties may be measured with infrared, ultraviolet, or mass spectroscopy.

A process control scheme may involve a single level or stage of feed injectors, or multiple levels (multistage) feed injectors, for example, uniformly distributed around the circumference of an FCCU reactor riser. For a typical reactor configuration, the total feed, comprising preheated fresh feed plus cracked recycle stocks from a downstream FCCU fractionator, is typically combined upstream of the feed injector nozzles. This total feed stream is typically combined with riser feed injection steam and sent to the feed injector nozzles.

Because of existing FCC unit layouts, it may be prohibitively expensive to add additional feed injector nozzles of the variable type employed in the present invention to an existing first (bottom) level of feed injectors, since there may be a number of potential structural interference problems associated with this level of feed injectors in an existing unit. In such a case, additional levels of variable throat feed injectors, according to the present invention, may be provided.

It is not uncommon to practice staged and/or segregated contacting of feeds to an FCCU. For example, an FCCU having two risers has the capability to practice segregated feed contacting. As an example of various embodiments to which the present process is applicable, a particular FCCU, for example having levels Nos. 1, 2, and 3 on a vertical axis of its riser, may have the following processing options:

a. Total feed to level No. 1. (Total feed can be comprised of any or all of any of the following: virgin or processed or pretreated vacuum gas oil, imported vacuum gas oil, imported resid, recycle streams from the FCCU fractionator, or recycled streams from other refinery process units.)

b. Virgin or processed or pretreated vacuum gas oil (VGO) to level No. 1 and FCCU recycle streams to level No. 2.

c. Total feed to level No. 2 (reduced reactor residence time mode).

d. Virgin or processed or pretreated vacuum gas oil (VGO) to level No. 1, HCCO (heavy catalytic cycle oil) recycle to level No. 2, and bottoms recycle to level No. 3.

e. Virgin or processed or pretreated vacuum gas oil (VGO) to level No. 2 and FCCU recycle streams to level No. 3.
f. Virgin or processed or pretreated vacuum gas oil (VGO) and recycle streams to level No. 1 and imported (resid) feed to level No. 2.
g. Virgin or processed or pretreated vacuum gas oil (VGO) to level No. 1 and recycle streams plus imported (resid) feed to level No. 2.
h. Virgin or processed or pretreated vacuum gas oil (VGO) to level No. 1, recycle streams to level No. 2 and imported (resid) feed to level No. 3.
i. Virgin or processed or pretreated vacuum gas oil (VGO) and recycle streams to level No. 2 and imported (resid) feed to level No. 3.

In preferred embodiment of a staged/segregated FCCU reactor system, the best quality feed is reacted with the best quality, most active catalyst first. In subsequent stages, preferably lower quality feeds are introduced into the reactor system.

In a single stage reaction system, the preferred location of a level or ring of variable throat feed injector nozzles is at the inlet to the reactor riser (sometimes also called the transferline reactor). Suitably, a number of nozzles are uniformly distributed around the perimeter of the reactor riser to insure good catalyst/oil contacting and mixing.

In a multistage reactor system, wherein an existing unit is revamped in order to practice the present process, a preferred operating mode is as follows. Total FCCU feed components can be classified into two broad categories: good (e.g., virgin) feed and poor (e.g., cracked recycle) feed. Typically a virgin hydrotreated VGO feed is introduced to an existing first level of feed injectors, at the inlet to the reactor riser, where these feed injectors can be either fixed throat or variable throat feed injectors. Typically, roughly 80% of the total feed is good, in this case VGO. This good feed component of the total feed is contacted and reacted with the regenerated catalyst at a slightly higher catalyst/oil ratio in the reaction zone between the first and second levels of feed injectors.

The HCCO (heavy catalytic cycle oil) and bottoms recycle streams from the FCCU fractionator which comprise the so-called poor feed typically represents the other 20% of the total feed. They may be injected through variable throat feed injector nozzles at a second and optional third level of feed injectors. The HCO and bottoms recycle streams are typically very aromatic, refractory type materials which have poorer yield selectivities compared to fresh feed. By segregating this material and staging the reaction system, a more attractive product yield distribution is achieved and additional process flexibility is gained.

Segregation of the feed components and staging of the reaction system into two zones or stages achieves an estimated 10% reduction in coke. This translates into a similar increase in capacity for an air-limited unit. It is estimated that application of variable throat feed injectors to a second level of feed injectors can achieve an additional reduction in coke. This translates into additional increased capacity for an air-limited unit.

Because of the fluid property and chemistry differences between recycle streams and fresh feed streams, use of variable (movable) throat feed injectors on the recycle streams provides additional process flexibility. Because of feed segregation, the recycle streams can be atomized into the reactor system at the conditions that are the most optimal for these feed components. It is feasible that the first level feed will be optimized at a different degree of atomization than the second level feed to the reactor, because of the different hydrocarbon chemistries involved. The basis for these different optimizations will be unit specific based on operating objectives and prevailing economics.

As an alternative case, segregated feeds can be processed at a single level of feed injectors using separate nozzles.

Variable throat injectors which may be employed in the present invention can be made by appropriate modification of a conventional fixed throat injector, for example, by adding a movable throat insert as detailed below. Types of fixed throat designs are numerous and include, but are not limited to, converging-diverging, converging, converging-diverging fan and spiral type. Extension of this invention to other nozzle geometries and other fixed throat nozzle designs will be appreciated by those skilled in the art. Any feed injector system which is capable of varying the feed atomization in a controllable manner can be employed in practicing the present invention.

Having thus described the invention in general terms, reference is now made to FIG. 1 which illustrates a typical fluid catalytic cracking system. Application of the subject invention is not limited to this type of system and is equally applicable to other type cracking systems and to other zone configurations and positions. Various conventional items such as valves, pumps, compressors, steam lines, instrumentation and other process equipment and control means have been omitted from the figures for the sake of simplicity. Variations obvious to those having ordinary skill in the art of catalyst cracking processes are included within the broad scope of the present invention.

Referring now to FIG. 1, there is shown a vertically arranged cylindrical reaction zone 10 containing a transferline reactor 12 of catalyst in which a hydrocarbon feedstock introduced at line 16 is undergoing catalytic cracking. Hydrocarbon feedstocks that can be suitably employed in a fluid catalytic cracking process include naphthas, light gas oils, heavy gas oils, wide-cut gas oils, vacuum gas oils, kerosenes, decanted oils, residual fractions, reduced crude oils, cycle oils derived from any of these, as well as suitable fractions derived from shale oil kerogen, tar sands bitumen processing, synthetic oils, coal hydrogenation, and the like. Such feedstocks may be employed singly, separately in parallel reaction zones, or in any desired combination. Hydrocarbon gas and vapors passing through the transferline reactor 12 maintain the catalyst in a turbulent fluidized condition having the appearance of a boiling liquid.

In general, any commercial hydrocarbon conversion catalyst designed for high thermal stability could be suitably employed in the present invention. Such catalysts include those containing silica and/or alumina such as well known zeolites.

In reaction zone 10, the cracking catalyst becomes spent during contact with the hydrocarbon feedstock due to the deposition of coke thereon. Thus, the terms "spent" or "coke-contaminated" catalyst as used herein generally refer to catalyst which has passed through a reaction zone and which contains a sufficient quantity of coke thereon to cause significant activity loss, thereby requiring regeneration. Typically, spent catalyst coke contents vary from about 0.5 to about 1.5 wt %.

Prior to actual regeneration, the spent catalyst is usually passed from the reaction zone into a stripping zone 18, below a fluidized bed level indicated at 14, below and contacted therein with a stripping gas, which is introduced into the lower portion of zone 18 via line 20. The stripping gas, which is usually introduced at a pressure of from about 10 to about 50 psig, serves to remove most of the volatile hydrocarbons from the spent catalyst. A preferred stripping gas is steam, although nitrogen, other inert gases or flue gas may be employed. Normally, the stripping zone is maintained at essentially the same temperature as the reaction zone, i.e., from about 850° F. to about 1100° F.

Stripped spent catalyst from which most of the volatile hydrocarbons have been stripped therefrom is then passed from the bottom of stripping zone 18, through a spent catalyst transfer line, such as J-bend 22 and interconnected vertical riser 24, which extends into the lower portion of a regeneration zone 26.

Riser 24 is shown entering regeneration zone 26 off-center to avoid interference with the auxiliary heating air from section 31 of the regeneration zone. In the embodiment shown, only one riser 24 is utilized. It is, however, within the contemplation of the subject invention that a plurality of risers may be used.

Air is added to riser 24 through line 41 and line 28 in an amount sufficient to reduce the density of the catalyst flowing therein, thus causing the catalyst to flow upward into the regeneration zone 26 by simple hydraulic balance.

In the particular configuration shown in FIG. 1, the regeneration zone is a separate vessel (arranged at approximately the same level as reaction zone 10) containing a dense phase catalyst bed 30 having a level indicated at 32, which is undergoing regeneration to burn of coke deposits formed in the reaction zone during the cracking reaction, above which is a dilute catalyst phase 34. An oxygen-containing regeneration gas enters the lower portion of regeneration zone 26 via line 36 and passes up through a grid 38 and the dense phase catalyst bed 30, maintaining said bed in a turbulent fluidized condition similar to that present in reaction zone 10. As will be discussed in more detail with respect to FIG. 2 hereinbelow, the present invention resides in an improved system of process control involving the introduction of feed into a cracking zone which, in this particular design, is located within riser 46.

Regenerated catalyst from the dense phase catalyst bed 30 in the regeneration zone 26 flows downward through standpipe 42 and passes through a J-bend into the reaction zone 10 by way of the transfer line 46 which joins the J-bend at the level of the oil injection line 16 above the J-bend. By regenerated catalyst is meant catalyst leaving the regeneration zone which has contacted an oxygen-containing gas causing at least a portion, preferably a substantial portion, of the coke present on the catalyst to be removed. More specifically, the carbon content of the regenerated catalyst can vary any where from about 0.01 to about 0.2 wt %, but preferably is from about 0.01 to about 0.1.

The hydrocarbon feedstock for the cracking process is injected into line 46 through line 16 via special feed injectors, to be described in detail below with reference to FIG. 3, to form an oil and catalyst mixture which is passed into the transferline reactor 12 within the reaction zone 10. Product vapors containing entrained catalyst particles pass overhead from the transferline reactor 12 into a gas-solid separation means 48 wherein the entrained catalyst particles are separated therefrom and returned through diplegs 50 leading back into the stripping zone 18. The product vapors are then conveyed through line 52 into the product recovery system.

In regeneration zone 26, flue gases formed during regeneration of the spent catalyst can pass from the dense phase catalyst bed 30 into the dilute catalyst phase 34 along with entrained catalyst particles. The catalyst particles are separated from the flue gas by a suitable gas-solid separation means 54 and returned to the dense phase catalyst bed 30 via diplegs 50. The substantially catalyst-free flue gas then passes into a plenum chamber 58 prior to discharge from the regeneration zone 26 through line 60.

It will be readily appreciated by those skilled in the art that the present invention may be applied beneficially to any type of fluid cat cracking unit with little or no modifications and without limitations as to the spatial arrangement of the reaction, stripping, and regeneration zones thereof.

Figure 2A:
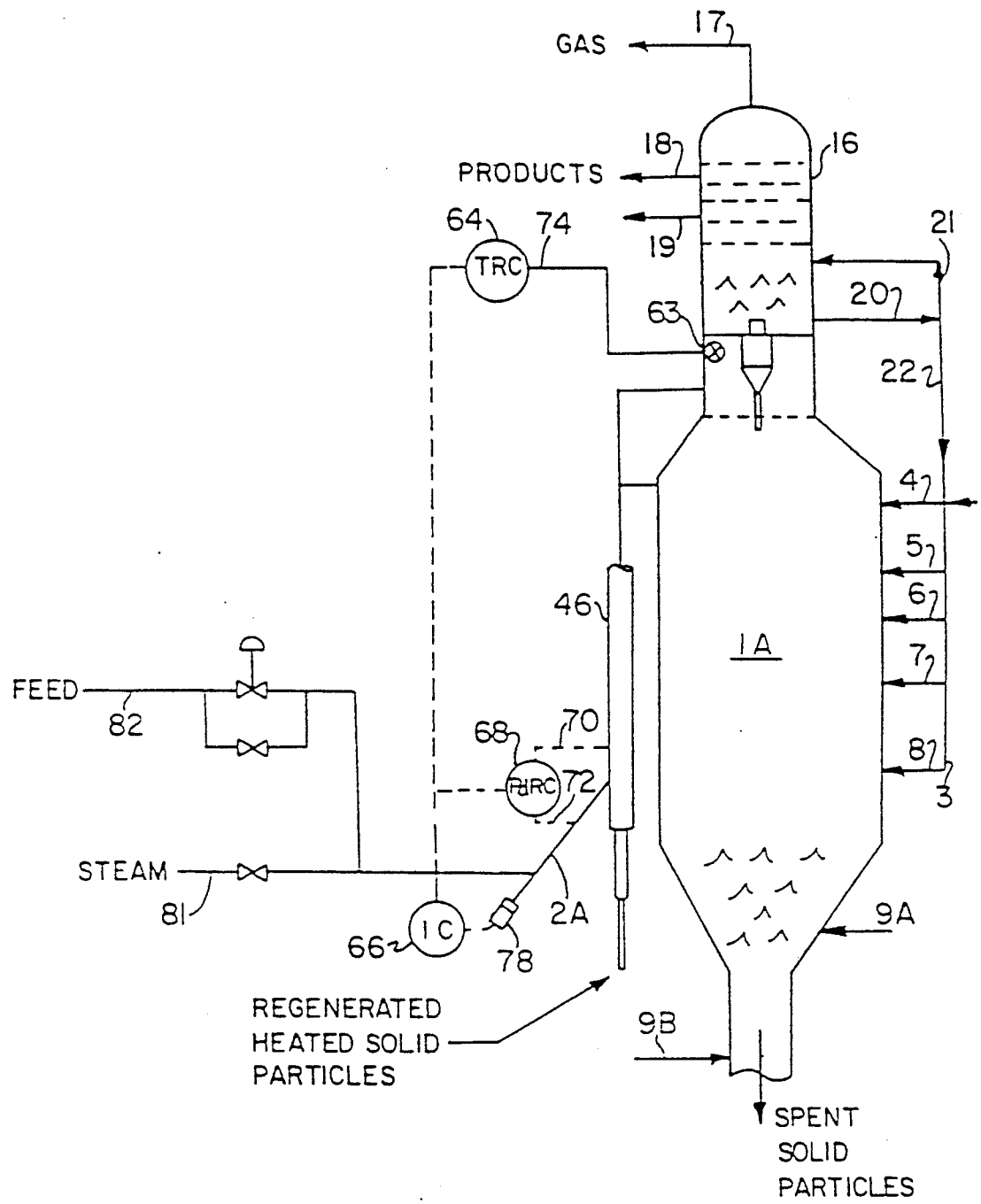
FIG. 2 is a flow diagram of the catalytic cracking reactor portion of the prior art and further depicts a product yield control system according to the present invention.
Figure 2B:
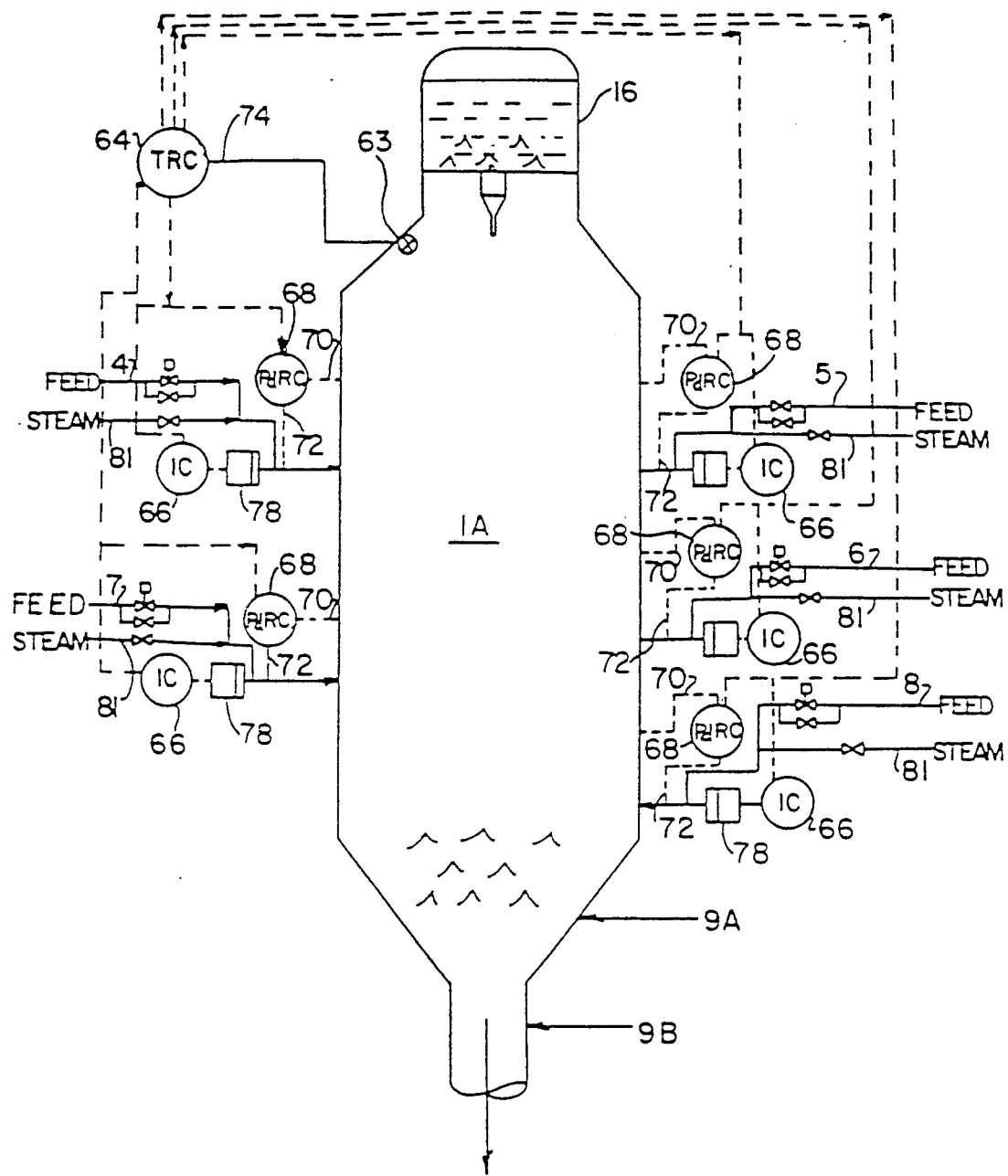

A better understanding of how the present invention may be applied to control product yields may be obtained by reference to FIG. 2, which shows the reaction portion of the FCCU in isolation from the regenerator portion and in conjunction with certain process control instrumentation and signals. The control system and equipment are in itself conventional, as will be readily appreciated by those skilled in the art and are therefore shown only schematically. The numbers in FIG. 2 which are less than or equal to 52 are the same as the numbers in FIG. 1 and correspond to the same parts.

Although schematically showing the feed injectors by a single line 62 in FIG. 2, this embodiment actually employs a plurality of feed injectors. There are typically two levels of feed injectors: a lower level, with three or more injectors evenly spaced around a lower circumference of the riser and a higher level, with three or more (3 to 20) injectors evenly space around a higher circumference of the riser. For reactor yield control purposes, the lower level of nozzles can be stroked by the controller 64, cascaded to feed injector controller 66. The higher level of nozzles can have pressure controller 68 cascaded to the same feed injector controller 66 in order to maintain a target level of atomization.

As evident in FIG. 2 and the above detailed description of the invention, the pressure controller 68, measures the pressure drop across a portion of the feed injector, suitably the difference between the pressure, as measured by line 70, within the riser 46 just outside the nozzle tip of the feed injector, and the pressure, as measured by line 72, at a point within the injector just prior to the nozzle throat section that is varied, as explained below with respect to FIG. 3. The pressure controller suitably, includes a comparator for measuring the difference with a target set point, typically 40 psi.

A sampling device 63, with an inlet to a measuring device, for example a conventional spectroscopic analyzer 65, measures in real time, the concentration of at least one of the components of the gaseous effluent product stream from the reactor in conduit 52, and a signal based thereon is sent via line 74 to a product controller 64. A high pressure liquid chromatograph may be used to separate the components of the product stream before measurement. The controller can calculate a yield or quality index and by means of a comparator, the measured yield can be compared to a set point. A signal based on the the calculated yield or difference from set point can be cascaded either directly to the injector controller 66 or in a layered hierarchy to the pressure controller 68 which in turn is cascaded to feed injector controller 66.

The injector controller 66 is used to individually adjust the pressure drop across the ten feed injectors. In each case, an actuator 78 is employed to vary the position of a suitable atomization adjusting means (not shown). In this embodiment, a movable member is employed to vary the cross-sectional flow area of a throat section of the feed injector and, thereby, the pressure drop. Steam via line 80 is typically introduced into the feed injector for admixture with the feed oil.

An additional embodiment would be to also sample the feed streams to the reactor riser for at least one key component which is an established precursor of a target reactor product yield and/or quality from the process.

Figure 3:
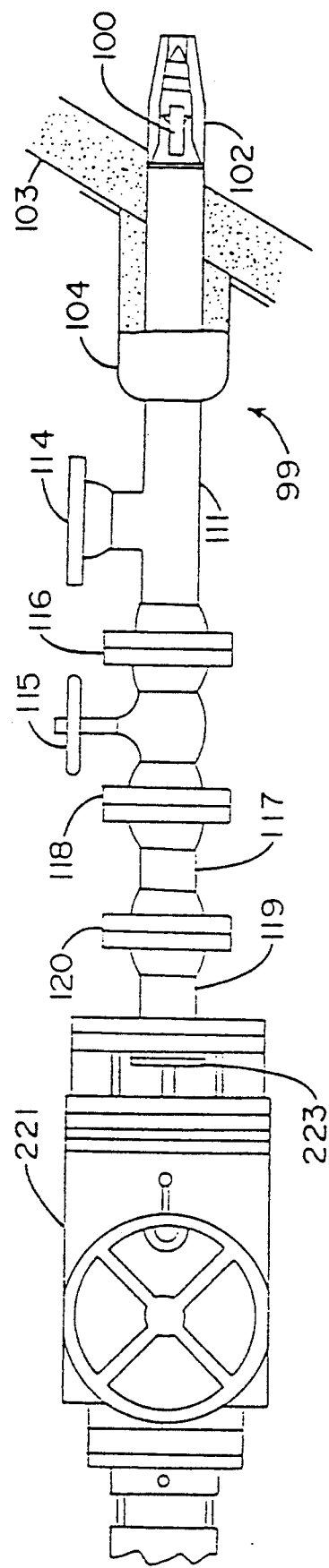
FIG. 3 is a schematic diagram of a variable throat FCCU feed injector assembly according to one aspect of the present invention.
Figure 4:
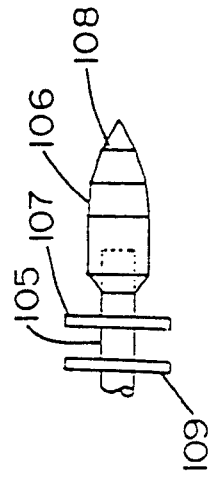
FIG. 4 is a schematic diagram, in greater detail, of the nozzle atomization adjustment assembly portion of the feed injector in FIG. 3.

Referring to FIG. 3, a preferred embodiment of an FCCU feed injector according to the present invention is shown, generally designated 99. This injector comprises at one end a nozzle tip 102. A fixed throat nozzle geometry is shown, it being understood that various nozzle geometries are quite possible.

The feed injector is connected to wall 103 of the FCCU reactor by what is termed a "thermal sleeve" arrangement 104. As evident, the feed injector assembly is an integral part of the FCCU reactor system. Other mechanical attachment arrangements will be familiar to those skilled in the art.

Figure 5:
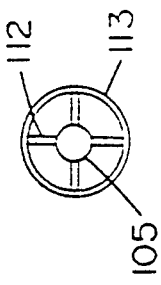
FIG. 5 is a front view of the premixer portion of the nozzle atomization adjustment assembly of FIG. 4.

A feed injector nozzle atomization adjustment assembly generally designated 100 comprises a shaft 105 and a head portion or adjusting means 106, is shown in greater detail in FIG. 5. An end tip portion 108 of this adjusting means 106 is designed to function within the converging fan tip nozzle 102. Modulation and/or positioning of the end tip portion 108 within the nozzle tip 102 will change the flow area and influence the atomization achieved by the nozzle tip 102. A preferred addition to the basic design of the variable throat feed injector is to include premixers 107 and 109 in close proximity to the nozzle insert tip 106. The premixers enhance the atomization, particularly the spray pattern, achieved by the variable throat feed injector. One embodiment of a FCCU feed injector assembly is shown in FIG. 3 and represents a minimum stroke design.

The two premixers 107 and 109 are staggered on a 45° offset and act as static mixers, slug/bubble breakers, fluid vibration dampeners and radial flow enhancers. From a fluid flow perspective, they impart a radial or swirling moment to the otherwise axial flow. This enhances the atomization achieved by the nozzle. If the flow regime of the fluid in the process pipe leading to the feed injector should happen to fall into an unattractive regime, such as slug flow, the premixers will serve as slug/bubble breakers and help supply a more homogeneous fluid phase mixture immediately upstream of the variable throat nozzle. This will also help enhance the atomization achieved by the nozzle. The premixers 107 and 109 also assist in alignment of the shaft 105 and atomization adjusting means 106 within the nozzle 102 and process piping 111. The details of a premixer are shown in cross-section in FIG. 5, wherein it is seen that spokes 112 radially emanate from shaft 105 and join a circular rim 113.

In the particular injector assembly configuration shown in FIG. 3, a mixture of steam and oil is introduced upstream of the nozzle tip 102 through a steam/oil fluid inlet 114. Because of oil partial pressure effects in the FCCU reactor, it is generally preferred to use an atomization enhancement medium such as steam to help assist in oil atomization, although other gases could be used. However, the variable throat feed injector could operate with oil-only feed, in a mode to pressure atomize/spray oil without steam being used. The atomization enhancement medium could alternatively be introduced into the FCCU reactor through separate connections. However, in a typical operating method for this variable throat feed injector, a steam/oil mixture is formed upstream of the nozzle by flow controlling the steam/oil ratio. The steam/oil ratio will be set based on oil properties and other process considerations. The oil phase may be partially vaporized as a result of preheating. Thus, the fluid mixture being supplied to the feed injector assembly will usually consist of a gas phase, a liquid oil phase and possibly a vapor oil phase.

To conserve on system size, an isolation valve 115 between flanges 116 and 118 may be used as part of the feed injector assembly to allow for onstream maintenance of the system. This isolation valve is usually a gate valve, although other valve types such as a ball valve may be used. The atomization adjustment assembly can be retracted, the isolation valve closed and the assembly removed as required for on-stream maintenance. For example, if feed type and chemistry should cause undesirable coking or partial plugging of the nozzle inside, the nozzle insert shaft assembly can be removed and subjected to onstream cleaning.

A maintenance receiver pipe section 117, suitably a spool section of piping, is provided between the isolation valve 115 and flange 120. A spool section 119 holding a conventional packing gland allows for modulation of a throat insert employed as an atomization adjusting means. A low leak design is preferred, although various packing gland designs are acceptable. This spool section 119 also allows for on-stream cleaning and maintenance of the nozzle atomization adjustment assembly. It will be appreciated that simplified injector assembly designs are optional, if onstream maintenance or cleaning is not a concern.

A suitable mechanical positioning means is exemplified by actuator assembly 221, which provides for the mechanical movement, modulation and stroke control of the nozzle atomization adjustment assembly and shaft. Control of the relative position of the nozzle atomization adjustment assembly relative to the nozzle tip 102 influences the atomization and/or spray pattern from the nozzle. In a typical design, a pneumatic actuator with a manual override feature (hand wheel operator) is employed. Other actuator configurations are also acceptable, including a hydraulic actuator or motor driven actuator. The actuator is capable of receiving control instructions from other instruments and controllers and moving the position of the atomization adjusting means based on these control instructions.

Generally, pneumatic actuator will be preferred over hydraulic actuators because of relative cost, and pneumatic or hydraulic actuators preferred over other types because of reliability. However, unit specific factors may influence actuator selection.

A shaft coupling 223, a bolted flange type, is shown to mate the shaft of the atomization adjustment assembly 100 to the actuator assembly 221. Various shaft coupling designs are acceptable.

Figure 6:
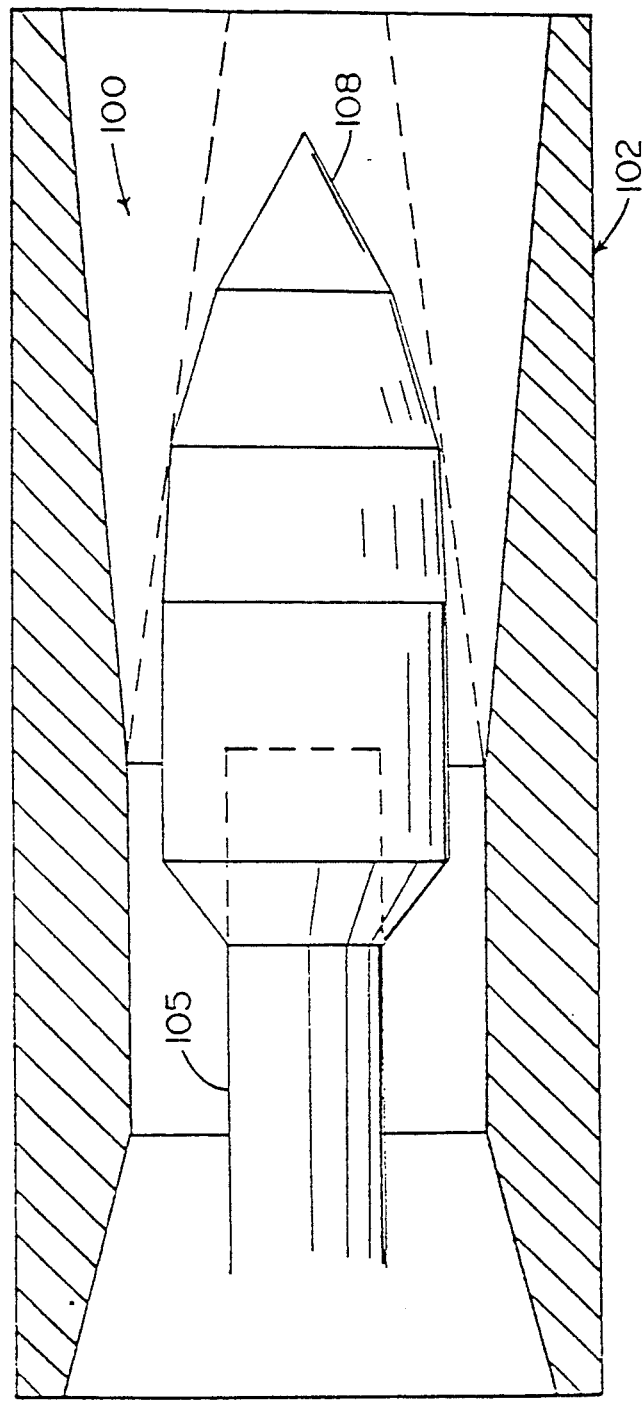
FIG. 6 shows in greater detail a nozzle atomization adjustment assembly while positioned within a variable throat converging fan nozzle.
Figure 7:
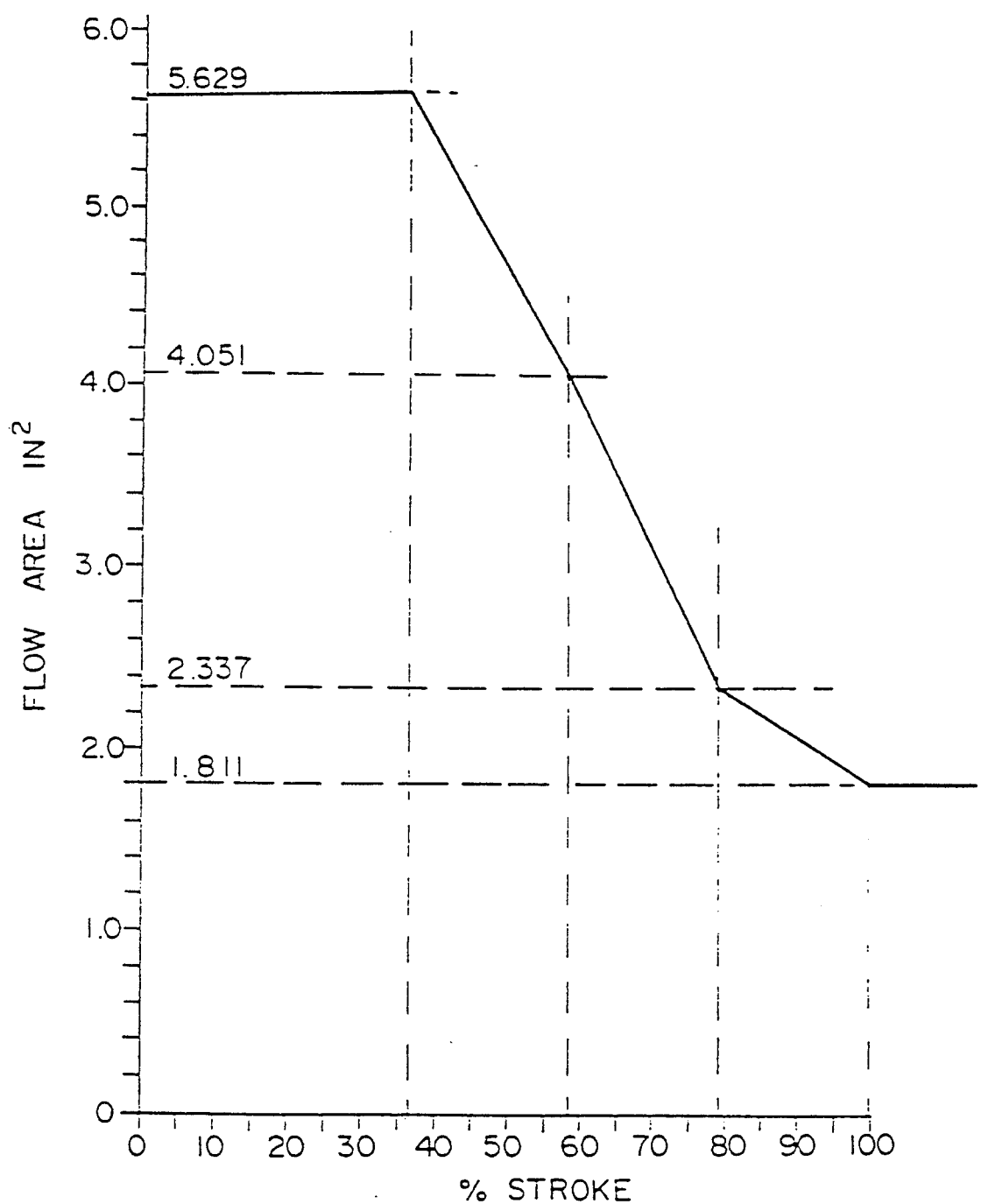
FIG. 7 is a typical graph of percent stroke versus flow area for the nozzle portion of a variable throat converging fan feed injector of the type depicted in FIG. 3.

FIG. 6 shows in a greater detail a nozzle adjustment assembly 100 (without premixers), positioned at the distal end of shaft 105 and inserted into fan nozzle 102. A tip portion 108 of the nozzle adjusting means 106 is shown at its estimated maximum insertion point. FIG. 7 shows a graph, for a typical variable throat nozzle, wherein the flow area is plotted against the percent stoke of the shaft used to move the nozzle atomization adjustment assembly by its actuator.

Figure 8A:
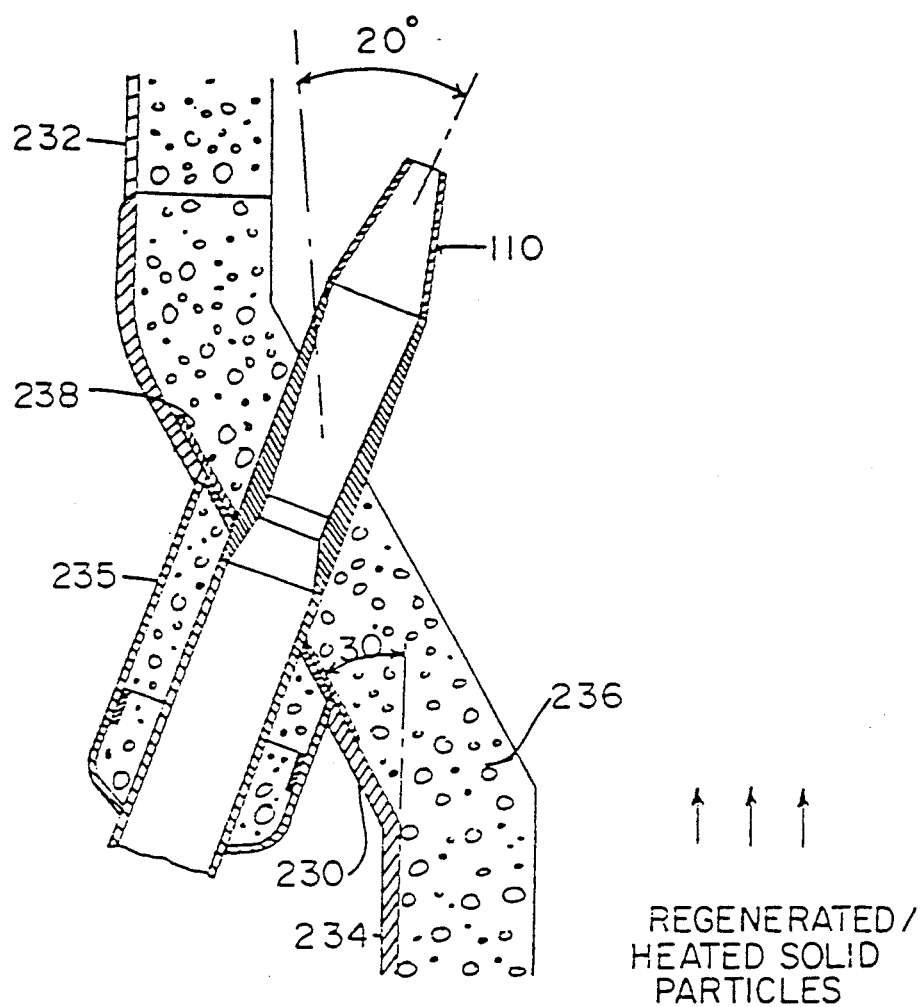
FIG. 8 is a schematic diagram of the feed injector depicted in FIG. 3, shown attached to a wall of the riser portion of the FCCU reactor.
Figure 8B:
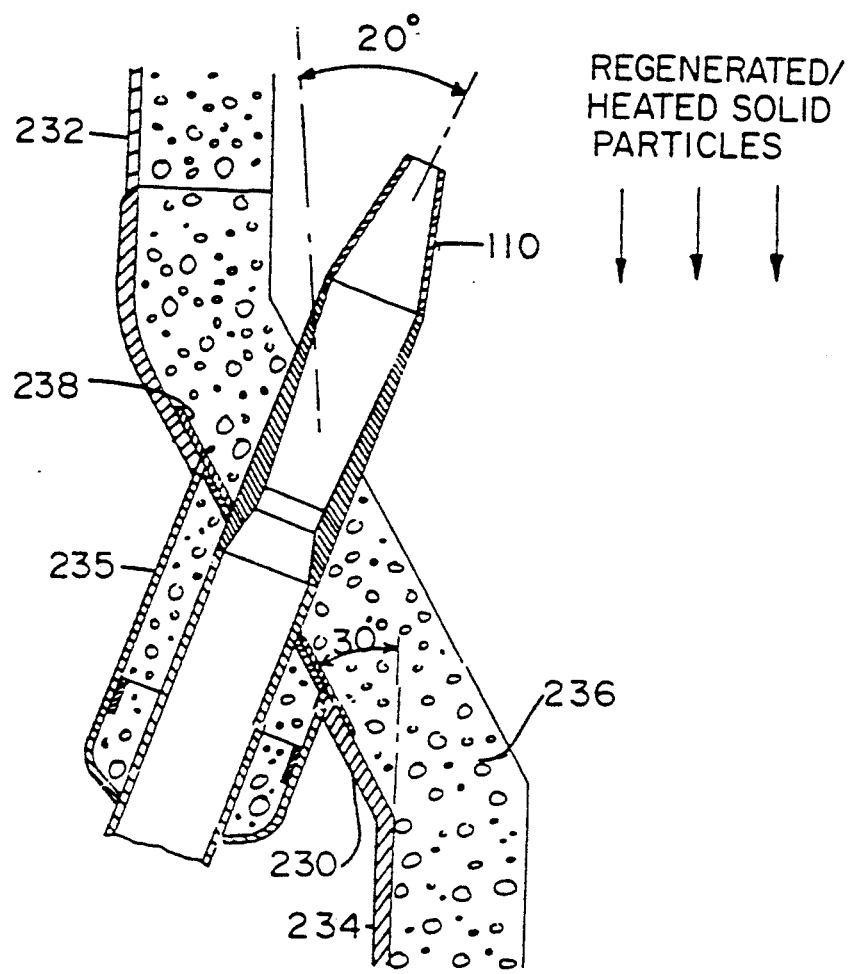

FIG. 8 shows in greater detail the installation of a typical feed injector attached to the wall of a catalytic reactor riser. The nozzle tip portion 110 of the feed injector is shown positioned at a preferred angle of 20 degrees tot he vertical, and the injector is shown in cross-section transversing a conical segment shaped wall section 230 which itself is at a 30 degree angle from the vertical, between an upper relatively larger diameter cylindrical vertical wall portion 232 and a lower relatively smaller diameter cylindrical vertical wall portion 234 of the riser. Different attachment angles and orientation angles may be optimal depending on the specific unit and type of injector. As evident, the installation of the injector is conventional and utilizes a pipe cap 235 and castable lining 236 beneath the metal walls of the reactor apparatus. A kaowool pad plate 238 surrounds the circumference of the feed injector where it pierces the riser wall. Welding at appropriate edges renders the connection airtight. Other mechanical attachment arrangements, known to those skilled in the art, are suitable. EXAMPLE 1

This example illustrates tests for collecting data on atomization associated with various nozzle configurations used in FCCU feed injection.

Fine droplets and a wide angle spray are expected to provide more rapid and uniform catalyst/oil mixing in the riser and improve the FCCU operation over the existing nozzles. The approach taken in these tests was to conduct cold model tests to examine the effects of liquid viscosity and vapor/liquid flow rates on droplet size, spray dispersion angle, and nozzle pressure drop. Droplet sizes of the sprays were measured with a Laser Doppler Anemometer (LDA). Nitrogen and water/glycerine solutions were used to simulate steam-oil feed. Correlations for predicting the mean droplet size and the pressure drop for a nozzle was developed for use in designing and controlling feed injectors according to the present invention.

Although pressure nozzles, spinning disks and pneumatic nozzles are three basic types of atomizers used in industry, these tests were confined to an investigation of pneumatic nozzles in which a compressible fluid such as air or steam of high velocity is used to disintegrate a liquid jet. The most widely quoted work in pneumatic atomization is a drop-wise correlation by Nukiyama and Tanasawa (Nukiyama and Tanasawa, *Trans. Soc. Mech. Engrg.*, Japan, 6122, 57-58, 1940). This correlation, however, was derived from test data with gas to liquid mass flow ratios on the order of ten compared to the mass flow ratio of about 0.01 used in these tests. For the present conditions, the correlation of Kim and Marshall (K. Y. Kim and W. R. Marshall, Jr., "Drop-size Distribution from Pneumatic Atomizers", *AIChE Journal*, pp. 575-584, Vol. 17, No. 3, May, 1971) is more suitable and therefore was used to compare the test measurements. Kim and Marshall covered the range of gas-liquid relative velocity from 250 ft/sec to sonic velocity, viscosity 1 to 50 cp, and gas-liquid mass ratio 0.06 to 40. The operating ranges of this test program were relative velocity of 200 to 700 ft/sec, viscosity 1.3 to 2.6 cp, and gas-liquid mass ratio from 0.002 to 0.008. These correlations are described below.

Kim and Marshall drop-size correlations for convergent-type pneumatic nozzles were obtained for the following ranges: drop-size, 6 to 350 μm mass medium diameter; mass flow ratio, 0.06 to 40; relative velocity, 250 ft/sec to sonic velocity, and viscosity 1 to 50 cp.

$$X_m = 249 \frac{\sigma^{0.41}\mu_1^{0.32}}{(v_{rel}^2 \rho_a)^{0.57} A^{0.36} \rho_1^{0.16}} +$$

$$1260 \left(\frac{\mu_1^2}{\rho_1 \sigma}\right)^{0.17} \frac{1}{v_{rel}^{0.54}} \left(\frac{M_a}{M_1}\right)^m$$

where $m = -1$, if $M_a/M_1 < 3$; $m = -0.5$, if $M_a/M_1 > 3$.

$$\overline{X}_{vs} = 0.83 \overline{X}_m$$

where: $\overline{X}_m$ = Mass medium diameter, μm
$\overline{X}_{vs}$ = sauter mean diameter, μm
$\sigma$ = Surface tension, dynes/μm
$\mu_1$ = Liquid viscosity, cp
$\rho_a, \rho_1$ = Gas and liquid densities, lb/ft³
$A$ = Area, ft²
$V_{rel}$ = Bas to liquid relative velocity, ft/sec
$M_a, M_1$ = Gas to liquid mass flowrates, lbs/min The experimental set-up consisted of a chamber (3 feet square and 6 feet long) equipped with light and viewing windows. The nozzle was mounted at one end of the rig and sprayed in horizontally. A screen at the far end of the rig was used to trap the spray. A liquid feed mixing tank was used to blend glycerine with water to provide the desired viscosity. Still pictures were taken to determine the spray angle and the Laser Doppler Anemometer (LDA) was used to measure drop size.

The LDA technique for sizing spherical droplets is based on the measurement of the relative phase shift that occurs when two light waves pass through the droplets on different paths. By measuring the visibility or amplitude modulation of the interference pattern formed by the scattered light and collected over a finite collecting operation, adequate information to size the droplets can be obtained.

The hardware system comprises the following pieces of equipment: transmitter, receiver, visibility processor, data management system, keyboard, Krohn-hite filter, and Anadex printer. The detailed descriptions of these components are given in "Operation Guide for Droplet Sizing Interferometer," by Spectron Development Laboratories, Inc., SDL No. 82-51025, Costa Mesa, Calif. (1982).

The function of the transmitter is to project two coherent laser beams into a chosen test space where they may be moving droplets. The droplets scatter light from the fringe pattern caused by the crossing beams and the frequency and modulation yield the velocity and size of the measured droplets. In general, it is necessary to perfect the new alignment each time anything is changed, but these adjustments are simple. The "permanent" alignments, which require more care, need only be touched very rarely, if at all.

The transmitter contains a Spectra-Physics Model Number 107 DEM Helium Neon Laser, laser power supply, steering mirrors, a telescopic beam expander, a half wave plate, a beam steering prism, a 50% beam-splitter and interchangeable output optics.

The receiver is essentially a telescope with a photomultiplier to collect light from the focal point, at which there is an interchangeable pinhole. The positioning of the entire assembly is so as to align it approximately with the transmitted probe volume. The receiver collects light that has been scattered from anything within the illuminated sample volume and directs it on to the cathode of the photomultiplier.

The Visibility and Doppler Signed Processor is a microprocessor which produces particle size information from optical data transmitted from the receiver.

Figure 9:
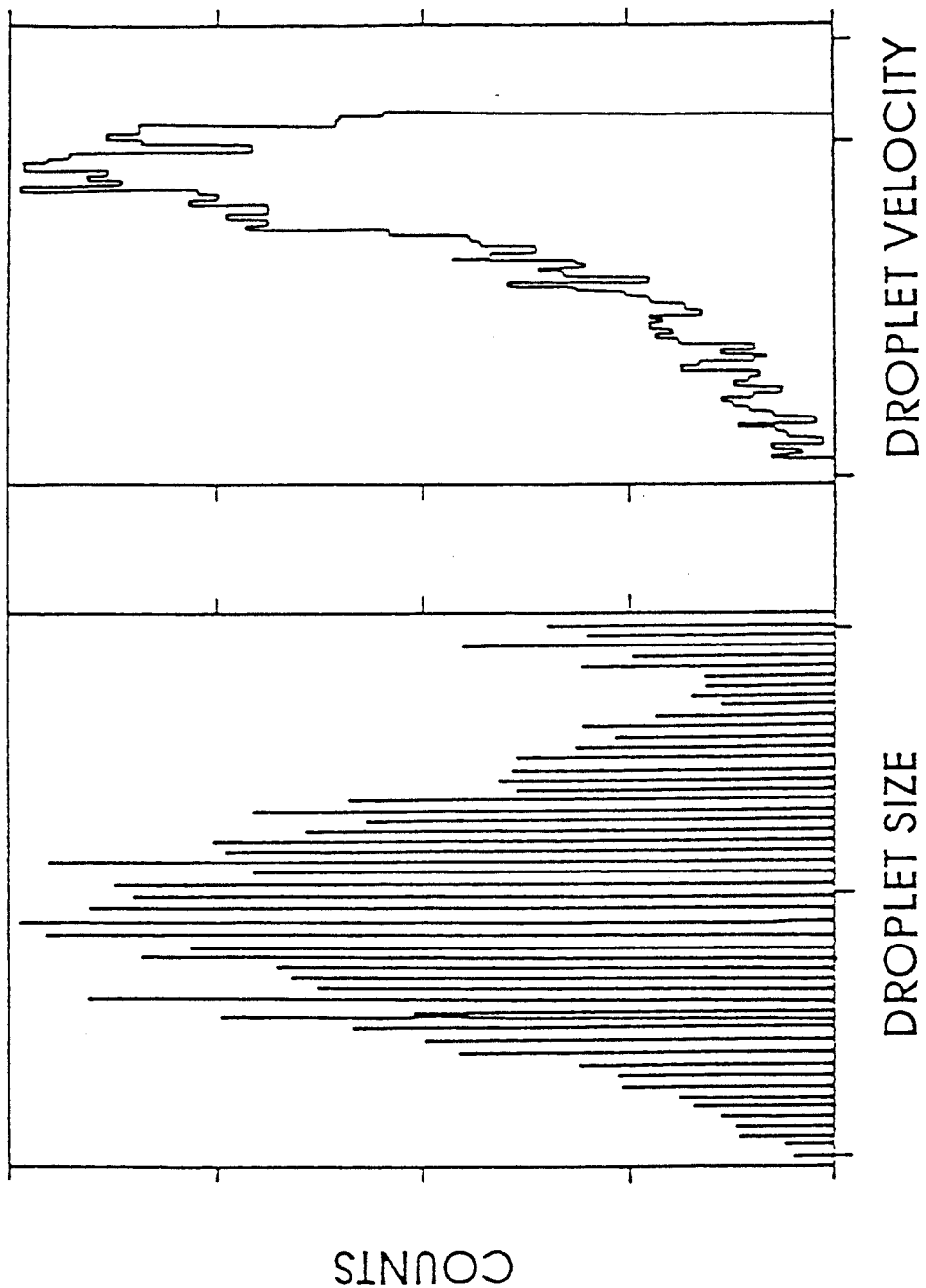
FIG. 9 shows a graph of a typical feed injector droplet size distribution and droplet velocity distribution.

An Apple-II Plus was used to collect and process data. FIG. 9 illustrates a typical droplet size distribution and a droplet velocity distribution. The output also includes linear mean diameter, surface mean diameter, volume mean diameter, sauter mean diameter, and droplet mean velocity.

Three different test nozzles (numbered 1, 2, and 3) were studied, wherein the drop size and spray angle associated with each of the three nozzles were measured at various vapor/liquid feed rates. Sauter mean diameter of drops with nozzles nos. 1 and 2 were all greater than 1000 $\mu m$ (Run 1-6 and 17-21). The drop size measurement with LDA was restricted to 1000 $\mu m$ or smaller due to the narrow angle of laser beams achievable through the tank windows.

The distribution of drop sizes with nozzle no. 3 appear to be wide and bimodal. A complete first mode and part of the second mode were recorded in the sprays when the liquid flow rate was lowest at 10 gpm as in Runs 11 and 16. The base case liquid rate scaled down from a commercial FCCU is 20 gpm. This indicates that spray drop size can be reduced by lowering the liquid feed rate in the commercial FCCU when using a fan nozzle. Higher liquid viscosity gave larger drops as indicated by the drop size data with 1.3 cp (Runs 7, 8, 11) and 2.6 cp (Runs 12, 13, 16) liquids.

The spray dispersion angles obtained from pictures with nozzle no. 3 were in the range of 80° to 110°, while those with nozzle no. 2 were between 25° and 40°. The spray angles with both nozzles were wider with higher gas/liquid ratios.

The nozzle pressure drop, representing energy consumption, was also compared with the three nozzles. The data, shown in Table 1, indicates that $\Delta P$ with nozzle no. 3 was about 33% lower than with nozzle no. 2 at the same gas/liquid flow rates. The effect of liquid viscosity on $\Delta P$ was not noticeable in the narrow viscosity range of 1.3 to 2.6 cp.

Reasonably good results were obtained with the exponent m of the Kim and Marshall correlation was taken to be $-0.9$ to predict the Sauter Mean Diameter (SMD) of the fan nozzle spray. Such data on various flow rates, fluid properties, and nozzle designs and control responses can be used to develop correlations useful for feed injector design and control responses.

TABLE 1

| | FCCU Feed Nozzle Test Parameters and Test Results | | | | | | |
|---|---|---|---|---|---|---|---|
| Nozzle No. | Gas Flowrate scfm | Liquid Flowrate gpm | Liquid Viscosity cp | Vel. @ Throat ft/sec | Nozzle $\Delta P$ psi | Spray Angle ° | Sauter Mean Diameter $\mu m$ |
| 1 | 9.2 | 20 | 1.3 | 100 | 18 | —(4) | 1000+ |
| 1 | 9.2 | 20 | 1.3 | 100 | 18 | —(4) | 1000+ |
| 2 | 18.5 | 20 | 1.3 | 178 | 25 | —(4) | 1000+ |
| 2 | 4.6 | 20 | 1.3 | 62 | 15 | —(4) | 1000+ |
| 2 | 9.2 | 40 | 1.3 | 123 | 51 | —(4) | 1000+ |
| 2 | 9.2 | 10 | 1.3 | 89 | 7 | —(4) | 1000+ |
| 3 | 9.2 | 20 | 1.3 | 100 | 13 | —(4) | 789 |
| 3 | 18.5 | 20 | 1.3 | 178 | 18 | —(4) | 813 |
| 3 | 4.6 | 20 | 1.3 | 62 | 10 | —(4) | 1000+ |
| 3 | 9.2 | 40 | 1.3 | 123 | 36 | —(4) | 1000+ |
| 3 | 9.2 | 10 | 1.3 | 89 | 3 | —(4) | 690 |
| 3 | 9.2 | 20 | 2.6 | 100 | 12 | 80 | 835 |
| 3 | 18.5 | 20 | 2.6 | 178 | 17 | 110 | 857 |
| 3 | 4.6 | 20 | 2.6 | 62 | 10 | 80 | 1000+ |
| 3 | 9.2 | 32 | 2.6 | 114 | 26 | —(4) | 1000+ |
| 3 | 9.2 | 10 | 2.6 | 89 | 3 | 95 | 773 |
| 2 | 9.2 | 20 | 2.6 | 100 | 18 | 35 | 1000+ |
| 2 | 18.5 | 20 | 2.6 | 178 | 25 | 40 | 1000+ |
| 2 | 4.6 | 20 | 2.6 | 62 | 15 | 35 | 1000+ |
| 2 | 9.2 | 38 | 2.6 | 121 | 49 | —(4) | 1000+ |
| 2 | 9.2 | 10 | 2.6 | 89 | 7 | 25 | 1000+ |

EXAMPLE 2

This example illustrates how plant test information can be collected from a number of similar commercial FCCU units to measure product yield and quality changes associated with feed injector changes, including nozzle $\Delta P$ and resistance coefficient. For example, using a computer simulation software model, a product such as coke can be measured as a function of known inputs times a unit factor based on the feed injector, thereby characterizing yield or quality shifts on a "unit factor" basis. Such unit factor data is shown in Table 2 below. The unit factor for each FCCU reactor product yield can be plotted versus a nozzle resistance coefficient.

TABLE 2

| Feed Injector: | Fixed Throat Injector | Variable Throat Injector |
|---|---|---|
| Coke | 0.79 | 0.47 to 0.79 |
| Conversion | 1.08 | 1.06 to 1.08 |
| $C_2$ Unsats/$C_2$ Sats | 1.04 | 0.81 to 1.04 |
| Total $C_2$s | 0.89 | 0.62 to 0.89 |
| $C_3$ Unsats/$C_3$ Sats | 0.69 | 1.34 to 0.69 |
| Total $C_3$s | 1.34 | 1.07 to 1.34 |
| $C_4$ Unsats/$C_4$ Sats | 0.70 | 1.52 to 0.70 |
| Total $C_4$s | 1.07 | 1.07 |
| $C_5$ Unsats/$C_5$ Sats | 0.68 | 1.88 to 0.68 |
| Total $C_5$s | 1.02 | 1.04 to 1.02 |
| $C_5$ Saturates N/I Ratio | 0.99 | 1.45 to 0.99 |
| $C_5$/430 Ron-Clear (LCN) | +1.8 | $-0.60$ to 1.8 |

EXAMPLE 3

This example illustrates a flow control scheme for an FCCU according to the present invention. The following description was prepared for application to a Flexicracking ™ (a trademark of Exxon Research and Engineering Company) fluid catalytic cracking unit, and uses instrument tag ID numbers, etc., for a particular plant. Nevertheless, application of the principles described herein to other fluid catalytic cracking units will be appreciated by those skilled in the art. The following information in Tables 3, 4, 5 and 6 is used in this control scheme. (Units of Klb/hr, °F, psi and psig are obtained by computer conversions.)

TABLE 3

Process Information (available from unit instrumentation)

| Instrument ID | Description |
|---|---|
| FC-F2005-IC | Riser Injection Steam Rate |
| FC-F2004-RC | Reactor Total Feed Rate |
| FC-F2216-IC | HCCO Recycle Rate |
| FC-F2224-IC | Bottoms ("Slurry") Recycle Rate |
| FC-F2203-I | Total Fresh Feed Rate |
| FC-T2214-RC | Total Fresh Feed Temperature |
| FC-T2248-I | Total Fresh Feed Temperature |
| FC-P2099-dRC (A to J) | Feed Injector Nozzle Pressure Drop |
| FC-Z2099-I (A to J) | Feed Injector Nozzle Insert Position |
| FC-P2005-dR | Reactor Riser Differential Pressure |
| FC-P2001-R | Reactor Top Pressure |
| FC-P2002-dRC | Reactor/Regenerator Differential Pressure |
| FC-H2004-IC | Throttling Spent Catalyst Slide Valve Position |
| FC-P2010-dRC | Throttling Spent Catalyst Slide Valve Differential Pressure |
| FC-T2001-RC | Reactor Temperature |
| FC-F2522-RC | Propylene Product Rate |
| FC-F2319-RC | Light Cat Naphtha Product Rate |
| FC-F2321-R | Heavy Cat Naphtha Product Rate |
| FC-F2213-IC | LCCO Product Rate |
| FC-F2224-IC | Bottoms ("Slurry") Product Rate |

TABLE 4

Process Information (calculated by the control computer)

| PMX Variable ID | Definition | Calculation |
|---|---|---|
| FC-X2000 | Total Recycle to Total Feed Ratio | (F2216 + F2224)/F2004 |
| FC-X2001 | "Slurry" Recycle to Total Feed Ratio | F2224/F2004 |
| FC-X2002 | HCCO Recycle to Total Feed Ratio | F2216/F2004 |
| FC-X2003 | Fresh Feed to Total Feed Ratio | F2203/F2004 |
| FC-X2004 | Total Mass Flow Rate | F2005 + F2203 + F2216 + F2224 |
| FC-X2005 | Est. Nozzle Outlet Pressure | P2005 + P2001 + 14.7 |
| FC-X2006 | Est. Nozzle Inlet Pressure | X2005 + P2099avg |
| FC-P2099avg | Average Nozzle Pressure Drop | (P2099A + P2099B + P2099C + P2099D + P2099E + P2099F + P2099G + P2099H + P2099I + P2099J)/10 |
| FC-X2007 | Nozzle Pressure Ratio | X2006/X2005 |
| FC-X2008 | Average Feed Temperature | (T2214 + T2248)/2 |
| FC-XVAPRF | Estimated Vapor Fraction | (XKFF/11.6) * (0.01 + (0.08/300) * (X2008 − 400)), a GSK-specific estimate |
| FC-X2009 | Estimated HC Vapor Rate | XVAPFR * F2203 |
| FC-X2010 | Estimated Steam Density | (((X2006 + X2005)/2) * 18)/(10.73 * (X2008 + 460)), lb/cf |
| FC-X2011 | Est. HC Vapor Denisty | (((X2006 + X2005)/2) * 300 * (11.6/XKFF))/(10.73 * 0.95 * (X2008 + 460)), lb/cf |
| FC-X2012 | Est. Fresh Feed Density | 62.4 * XFFSG, lb/cf |
| FC-X2013 | Est. HCCO Density | 62.4 * XHRSG, lb/cf |
| FC-X2014 | Est. Bottoms Density | 62.4 * XBRSG, lb/cf |
| FC-X2015 | Steam Volume | F2005/X2010 |
| FC-X2016 | HC Vapor Volume | X2009/X2011 |
| FC-X2017 | FF Liquid Volume | (F2203 − X2009)/X2012 |
| FC-X2018 | HCCO Volume | F2216/X2013 |
| FC-X2019 | Bottoms Volume | F2224/X2014 |

TABLE 4-continued

Process Information (calculated by the control computer)

| PMX Variable ID | Definition | Calculation |
|---|---|---|
| FC-X2020 | Total Volume | X2015 + X2016 + X2017 + X2018 + X2019 |
| FC-X2021 | Two Phase Mixture Density | (X2015/X2020) * X2010 + (X2016/X2020) * X2011 + (X2017/X2020) * X2012 + (X2018/X2020) * X2013 + (X2019/X2020) * X2014, lb/cf |
| FC-X2022 | Vapor Phase Density | (X2015/X2020) * X2010 + (X2016/X2020) * X2011, lb/cf |
| FC-X2023 | "y" | (X2009 + F2005)/X2004 |
| FC-X2024 | "B" | X2023 ** −0.49 |
| FC-X2025 | Sonic Velocity | 68 * (X2024/X2021) * ((XCPCV * ((X2005 + X2006)/2) * X2022) ** 0.5) |
| FC-X2026 | Throat Avg Velocity | X2020/(3600 * XTONAREA) |

The variable XTONAREA is the total nozzle flow area, sq. ft. Individual position of the nozzle insert in each nozzle will allow the flow area in the throat to be calculated for the nozzle geometry. The total flow area available is then calculated based on the number of active nozzles in service.

The throat velocity is compared to the Sonic velocity. If the throat velocity is greater than 65% of the Sonic velocity, then the Sonic flow pressure drop equation is used to calculate a flow coefficient ("CF"). If the throat velocity is less than 65% of sonic the sub-sonic flow equation is used to calculate a flow coefficient. Sub-sonic "CF" is defined as follows:

$$CF = ((A_o * 2 * X2021 * X2026 * X2026)/P2099avg) ** 0.5$$

Sonic "CF" is defined as follows:

$$CF = ((B_o * 2 * X2021 * X2026 * X2025)/P2099avg) ** 0.5$$

where $A_o$ and $B_o$ are constants which must be determined empirically for each particular nozzle design.

TABLE 5

Calculated Yield Quality Parameters

| Variable ID | Definition | Calculation |
|---|---|---|
| FC-X2030 | LCCO Yield | (F2213IC/F2203I) * 100 |
| FC-X2031 | Bottoms Yield | (F2226/F2203I) * 100 |
| FC-X2032 | LCN Yield | (F2319RC/F2203I) * 100 |
| FC-X2033 | HCN Yield | (F2321R/F2203I) * 100 |
| FC-X2034 | Propylene Yield | (F2522RC/F2203I) * 100 |
| FC-X2035 | Conversion | 100 − X2030 − X2031 |
| FC-X2036 | Naphtha Selectivity | (X2032 + X2033)/X2035 |
| FC-X2037 | Propylene Selectivity | X2034/X2035 |
| FC-X2038 | LCN Selectivity | X2032/X2035 |
| FC-X2039 | Distillate Selectivity | (X2033 + X2030)/X2035 |

TABLE 6

Run Plan-Specific Information
(supplied by the unit operator)

| "PMX" Variable ID | Description |
| --- | --- |
| FC-XKFF | Fresh Feed Characterization Factor |
| FC-XFFSG | Fresh Feed-Specific Gravity |
| FC-XHRSG | HCCO Recycle-Specific Gravity |
| FC-XBRSG | Bottoms Recycle-Specific Gravity |
| FC-XLRON | LCN Research Octane Number |
| FC-XHCLR | HCN Color |

A flow control operating mode will now be described using the information provided above. A computer-derived software process controller, in this case tagged XYIELD-RC, will reset the individual feed injector nozzle controllers to open or close the available flow area to allow more or less total feed to pass into the reactor. The flow coefficient parameter, "CF", will be monitored in a fashion to ensure that a good atomization region is being maintained for the majority of the feed injectors. Selected injectors will be manipulated by XYIELD-RC to influence the process and maintain a desired yield selectivity or product quality as process conditions change. For a typical MOGAS (Motor Gasoline) operation where naphtha yield and RON (Research Octane Number) are major objectives, the calculated naphtha selectivity parameter would be used as a control index. The basis could be either on an LCN basis or a total naphtha basis (LCN+HCN). In a simple process control configuration the calculated selectivity index, X2036 would be cascaded directly to the feed injection system. In a more advanced control program, some signal dampening and error dampening would be applied to the calculated index, X2036, before a signal is sent to the feed injection system. Unit specific responses would influence the choice and design of the software controller. The primary parameter being controlled in this control scheme is the reactor product yields and heat of cracking required by the reactor. The control computer calculated flow coefficient is used as an index to manipulate the reactor yields and heat balance, to achieve the target process objectives and to maintain the key yield selectivity at a target set point.

Because of potential adverse yield effects, the control of the reactor yields is limited to an acceptable range or band.

The target yield selectivity is controlled to a fine-tuned, precise target through the software controller, XYIELD-RC. This allows for real time compensation for changes which may occur in other process parameters such as feed quality or the quality of recycle material.

If it is desired to control a key product quality such as naphtha octane or distillate color then a computer-based software controller XQUAL-RC would be used in a similar fashion as XYIELD-RC. For the quality control, some laboratory data and/or some on stream quality measurements would be needed. In a typical configuration refinery laboratory measurements would serve as input to the controller, XQUAL-RC. The nozzle flow coefficient would be monitored to ensure that it remained within an acceptable operating range, consistent with global product quality objectives. The nozzle flow coefficient, "CF", is a more direct indication of the performance of the feed injector nozzle. Because of the relatively long time associated with obtaining product quality information and because of potential interference from operating changes in the product fractionators, additional process readings would be monitored before the XQUAL-RC controller would send control signals to the feed injection system.

In a typical commercial operation, the yield selectivity control mode would probably be the preferred control mode, because application in a real time environment is easier to accomplish and there are fewer sources of error associated with the control signal. The relationship between a feed quality change and a yield selectivity change is more direct, when compared to a product quality change.

The process feed injector pressure drop reading is a gross indication of feed injector atomization (at a constant flow rate through the injector), but many process factors can and will influence this reading. By applying the sub-sonic or sonic feed injector pressure drop equations to calculate a flow coefficient, "CF", a more representative indication of feed atomization is obtained. This allows flexibility for more intelligent control decisions and control hierarchy to be applied to the fluid catalytic cracking process to achieve target operating objectives. Also, control of the feed injector atomization can achieve a much more precise control compared to throttling large catalyst flows through a slide valve or manipulation of feed preheat duty.

For a multiple nozzle feed injector configuration, manipulating only a portion of the nozzles will provide adequate product yield control. The remaining nozzles would be controlled based on the nozzle P-2099-dRC cascade to the nozzle actuator, H-2099-IC. The set point for these nozzle PdRCs will be based on run plan specific process objectives consistent with the product yield or quality objective under control. It is also possible that these remaining nozzles could be incorporated in this yield or quality control in a layered hierarchy. The nozzle flow coefficient "CF" would be used as a gauge of the current operating band relative to the control objectives. If the "CF" of the two to four nozzles being manipulated is driven too far from a specific target, then the entire group of nozzles would be repositioned to a new "CF" level.

For the operating scenario envisioned, two nozzles manipulating roughly 20% of the reactor total feed rate should provide sufficient response to the naphtha selectivity and heat of cracking to allow for very precise control of the unit naphtha selectivity as indicated by XYIELD-RC.

To minimize process disturbances, these two feed injector nozzles may be ramped open or closed by moving opposing pairs of nozzles as a unit. (The pairings would typically be as follows: A/F, B/G, C/H, D/I, and E/J). In the stroke range from 36% to 80% each pair of injectors would be moved the minimum amount needed to respond to changes in XYIELD-RC. For a 1% stroke increment the total nozzle throat area being manipulated at one time corresponds to about 0.3%. Table 8 below illustrates a typical sequential flow area change using this technique:

TABLE 7

| Nozzle ID | Start Stroke, % | Start Throat Area | First Step Stroke, % | First Step Throat Area |
| --- | --- | --- | --- | --- |
| (Nozzles A and F are being controlled by T-2099-RC) | | | | |
| A | 36 | 5.629 | 37 | 5.552 |
| F | 36 | 5.629 | 37 | 5.552 |
| (Nozzles B/G, C/H, D/I, and E/J are being controlled by their respective PdRC controllers) | | | | |
| B | 36 | 5.629 | 36 | 5.629 |

TABLE 7-continued

| Nozzle ID | Stroke, % | Throat Area | Stroke, % | Throat Area |
|---|---|---|---|---|
| G | 36 | 5.629 | 36 | 5.629 |
| C | 36 | 5.629 | 36 | 5.629 |
| H | 36 | 5.629 | 36 | 5.629 |
| D | 36 | 5.629 | 36 | 5.629 |
| I | 36 | 5.629 | 36 | 5.629 |
| E | 36 | 5.629 | 36 | 5.629 |
| J | 36 | 5.629 | 36 | 5.629 |
| Total Throat Area = | | 56.29 | | 56.14 |

| Nozzle ID | Second Step | | Third Step | |
|---|---|---|---|---|
| | Stroke, % | Throat Area | Stroke, % | Throat Area |
| (Nozzles A and F are being controlled by T-2099-RC) | | | | |
| A | 38 | 5.475 | 39 | 5.398 |
| F | 38 | 5.475 | 39 | 5.398 |
| (Other nozzles being controlled by their respective PdRC controllers) | | | | |
| B | 36 | 5.629 | 36 | 5.629 |
| G | 36 | 5.629 | 36 | 5.629 |
| C | 36 | 5.629 | 36 | 5.629 |
| H | 36 | 5.629 | 36 | 5.629 |
| D | 36 | 5.629 | 36 | 5.629 |
| I | 36 | 5.629 | 36 | 5.629 |
| E | 36 | 5.629 | 36 | 5.629 |
| J | 36 | 5.629 | 36 | 5.629 |
| Total Throat Area = | | 55.98 | | 55.83 |

Table 7 above illustrates how a very precise flow area control can be maintained and manipulated to achieve the desired level of feed atomization. The above case is an illustration of a controlled ramping closed of the feed injectors, caused by a change/deviation in XYIELD-RD from its set point. To ramp open the feed injector flow area a reverse sequence would be used.

The control computer application program could be constructed in several different forms. The reactor product yield selectivity controller XYIELD-RC, could be cascaded directly to the feed injector actuators, H-2099-IC (A and F), or in a layered hierarchy with XYIELD-RC cascaded to P-2099dRC (A and F) which in turn could be cascaded to the individual feed injector actuators, H-2099-IC (A and F). Having individual actuator controllers and PdRC instrumentation on each feed injector provides flexibility for on stream maintenance and control loop tuning of the feed injector system. Lower cost configurations are possible with fewer instruments, and would represent a simplified version of the configuration detailed above.

Figure 11A:
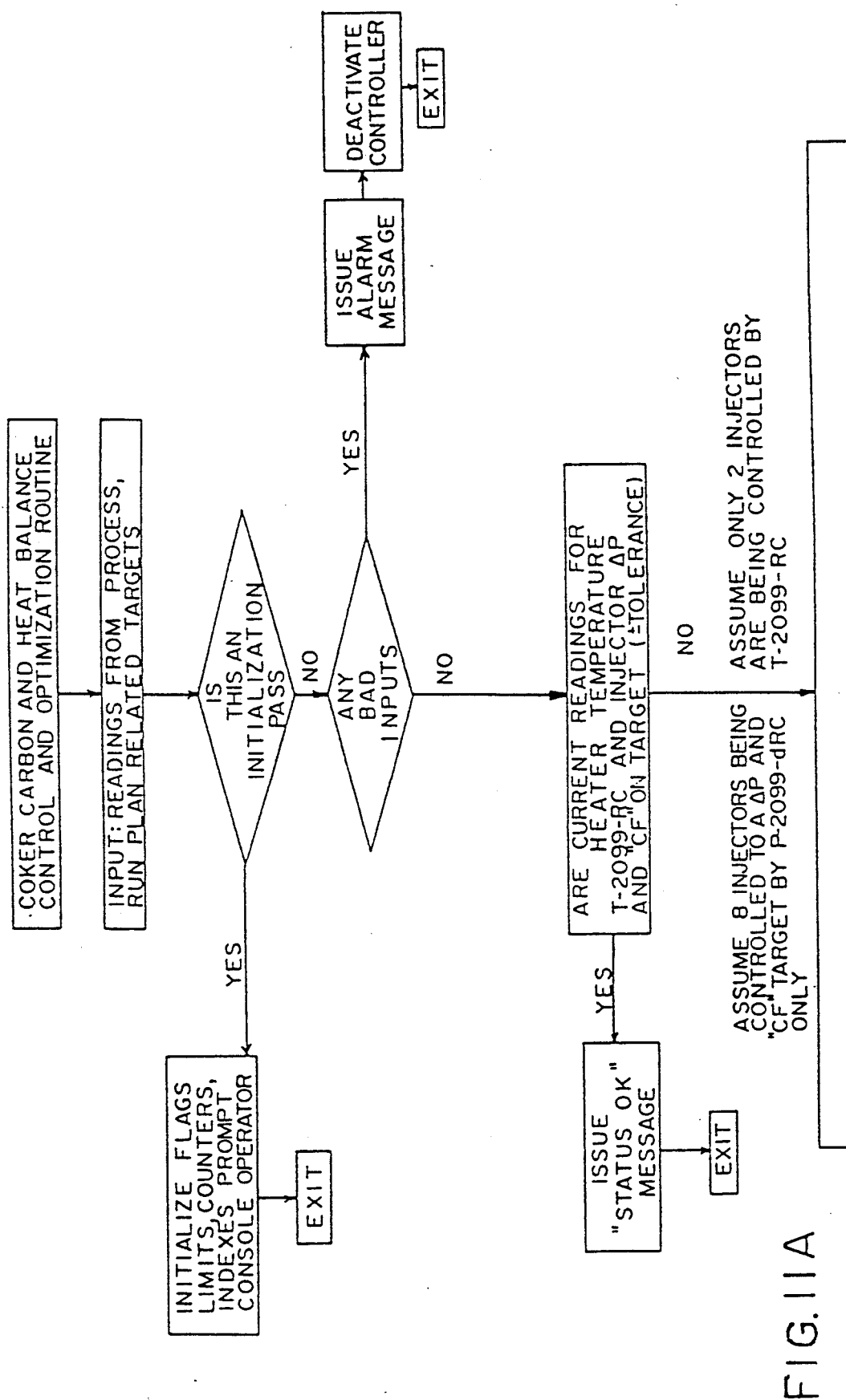
FIG. 11 (Parts A and B) is a flow chart illustrating a computer application program for carrying out a preferred embodiment of the invention according to Example 3 below.

FIG. 11 (parts A and B) is a flow chart illustrating the basic structure of a typical control computer application program to vary feed injector throat area based on FCCU reactor product yield or product quality requirements as indicated by the XYIELD-RC or XQUAL-RC application controllers. It is based on an embodiment comprising ten variable throat feed injectors with a PdRC controller cascaded to the injector actuator, HIC; P-2099-dRC-A is cascaded to H-2099-IC-A, etc. Naphtha yield selectivity is assumed to be the priority parameter. The process controller XYIELD-RC will generate controller signals in response to changes in the naphtha selectivity. XYIELD-RC is cascaded to two of the ten injectors. Console operator supplied set points for P-2099-dRC (A to J) are based on a unit specific run plan objectives to initialize the system. This set point will be consistent with a target spray pattern/degree of atomization. The calculated flow coefficient "CF" will be calculated in a real time frame. This "CF" parameter will be used as an index of feed atomization.

EXAMPLE 4

In the above example, a technical package reflecting applications of a FCCU process control scheme to a Flexicracking ™ unit was developed specifically for a particular Flexicracking ™ unit and uses instrument tag ID numbers, etc. from the plant. This application could be applied to other FCCUs in a similar fashion, although unit-specific items might influence the final functional form of the application as well as location-specific cost issues associated with any revamp.

The control scheme detailed above is based on a "single stage" reactor configuration where the oil feed is introduced at a specific point along the length of the reactor. This scheme could also be applied to "multi-stage" reactor configurations where the oil feed is introduced at several points along the length of the riser. When applied to a "multi-stage" configuration, various hybrid control configurations become possible. The matrix in Table 8 below illustrates how four distinct control schemes could optionally be applied to a two stage reactor configuration. For more than two stages, a much larger matrix is appropriate. A two stage system is viewed as a reasonable commercial configuration with three stages being a possible commercial "stretch case" depending on economics. The four distinct control schemes might typically be defined as follows: (1) total flow control, (2) reactor temperature control, (3) carbon and heat balance control, and (4) yield selectivity and/or quality control.

TABLE 8

Control Scheme Matrix - Two Stage Reactor Configuration
(Tag numbers refer to the control schemes detailed above)

| Case: | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| Stage A | 1 | 1 | 1 | 1 | 2 | 2 | 2 | 2 | 3 | 3 | 3 | 3 | 4 | 4 | 4 | 4 | 2 | 3 | 4 | 1 | 3 | 4 | 1 | 2 | 4 | 1 | 2 | 3 |
| Stage B | 1 | 2 | 3 | 4 | 1 | 2 | 3 | 4 | 1 | 2 | 3 | 4 | 1 | 2 | 3 | 4 | 1 | 1 | 1 | 2 | 2 | 2 | 3 | 3 | 3 | 4 | 4 | 4 |

For a multi-stage reactor configuration, a commercial installation would probably install the necessary instrumentation to provide flexibility to operate in any one of the 28 possible configurations outlined above. Various run plan-specific and economic-specific items would tend to favor certain operating cases over others, but it would be difficult to predict which of the 28 possible cases would be the most attractive under all possible operating scenarios.

It will be understood that while there have been herein described certain specific embodiments of the invention, it is not intended thereby to have it limited to or circumscribed by the details given, in view of the fact that the invention is susceptible to various modifications and changes which came within the spirit of the disclosure and the scope of the appended claims.

What is claimed is:

1. A process for obtaining desired product yield, product quality, or both, of a fluid catalytic cracking unit, wherein a hydrocarbonaceous feed is introduced into a reaction zone, by atomizing said feed first mixing it with an atomizing vapor, the feeding said mixture through two or more feed injectors which are comprised of a nozzle having an internal throat section in fluid communication with the reaction zone ad the source of tne feed, wherein the cross-sectional flow area of said throat section is variable by moving a throat insert member therein, wherein the atomization of said feed is effectively varied by varying the pressure drop across the two or more feed injectors by varying the cross-sectional flow area of the one or more feed injectors by causing the throat insert member to be moved, in real time, in response to a signal based on the difference between a measured product yield, measured product quality, or both, of the reaction zone and a predetermined set point of product yield, product quality, or both.

2. The process of claim 1, wherein said plurality of feed injectors is at least three feed injectors.

3. The process of claim 1, wherein the atomization is adjusted to change the measured naphtha liquid yield or selectivity.

4. The process of claim 1, wherein the atomization is adjusted to control the naphtha research clear number in an onstream mogas blending operation.

5. The process of claim 1, wherein the unit product yield and/or quality is cascaded to a feed injector pressure controller.

6. The process of claim 1, wherein said pressure drop $\Delta P$ is monitored by a pressure controller.

7. The process of claim 6, wherein the pressure controller sends a signal to an actuator for varying the cross-sectional flow area of the nozzle, thereby varying the pressure drop.

8. The process of claim 1, wherein the atomization is adjusted based on measurements of feedstock chemistry wherein at least one measured component in the field is a precursor for a target reactor yield and/or quality.

9. The process of claim 1, wherein a pressure drop set point is selected based on unit response trends relating product yield or quality to pressure drop $\Delta P$.

10. The process of claim 9, wherein the pressure drop set point is selected based on field calibration data constructed for each feed injector to define the relationship between nozzle pressure drop $\Delta P$ and position of a means for controlling the cross-sectional flow area of said nozzle portion of said feed injector.

11. The process of claim 10, wherein the field calibration data is incorporated into an application program that will send a signal to an actuator for varying the position of a body within the throat of said feed injector.

* * * * *